US008306959B2

(12) United States Patent
Nica

(10) Patent No.: US 8,306,959 B2
(45) Date of Patent: Nov. 6, 2012

(54) INCREMENTAL MAINTENANCE OF IMMEDIATE MATERIALIZED VIEWS WITH OUTERJOINS

(75) Inventor: Anisoara Nica, Waterloo (CA)

(73) Assignee: iAnywhere Solutions, Inc., Dublin, CA (US)

( * ) Notice: Subject to any disclaimer, the term of this patent is extended or adjusted under 35 U.S.C. 154(b) by 3 days.

(21) Appl. No.: 12/973,811

(22) Filed: Dec. 20, 2010

(65) Prior Publication Data

US 2012/0047117 A1     Feb. 23, 2012

Related U.S. Application Data

(60) Provisional application No. 61/371,413, filed on Aug. 6, 2010.

(51) Int. Cl.
*G06F 17/30*     (2006.01)

(52) U.S. Cl. ........................................ 707/702; 707/687

(58) Field of Classification Search ........................ None
See application file for complete search history.

(56) References Cited

U.S. PATENT DOCUMENTS

| 6,882,993 | B1 * | 4/2005 | Lawande et al. ............. 707/714 |
| 7,184,998 | B2 | 2/2007 | Nica |
| 7,546,311 | B2 | 6/2009 | Nica |
| 7,606,827 | B2 | 10/2009 | Nica |
| 2003/0093407 | A1 | 5/2003 | Cochrane et al. |
| 2007/0192283 | A1 | 8/2007 | Larson et al. |
| 2007/0214191 | A1 | 9/2007 | Chandrasekaran |
| 2009/0064160 | A1 | 3/2009 | Larson et al. |
| 2010/0161555 | A1 | 6/2010 | Nica et al. |

OTHER PUBLICATIONS

*ANSI/ISO/IEC International Standard 9075-2: Database Language SQL—Part 2: Foundation (SQL/Foundation)*, entire document (1147 pages), Sep. 1999.
*ANSI/ISO/IEC International Standard 9075-2: Information technology—Database languages—SQL—Part 2: Foundation (SQL/Foundation)*, entire document (1362 pages), 2008.

(Continued)

*Primary Examiner* — Anteneh Girma
(74) *Attorney, Agent, or Firm* — Sterne, Kessler, Goldstein & Fox PLLC

(57) ABSTRACT

Methods and systems for using algorithms in relational database management systems (RDBMSs) for incremental maintenance of materialized views with outerjoins are disclosed. The algorithms achieve the following goals with respect to a class of materialized outerjoin views and the performance of update operations: relax the requirement for the existence of the primary key attributes in a select list of the view to only some of the relations (i.e., the relations referenced as a preserved side in an outerjoin); relax null-intolerant property requirements for some predicates used in the view definition (i.e., predicates referencing relations which can be null-supplied by more than one outerjoin); and implement maintenance of outerjoin views by using one update statement (e.g., MERGE, UPDATE, INSERT, or DELETE) per view for each relation referenced in the view. The algorithms allow design and implementation of the incremental maintenance of materialized views with outerjoins to be integrated into an RDBMS.

30 Claims, 10 Drawing Sheets

OTHER PUBLICATIONS

Bowman, I.T. et al., "SQL Anywhere: A Holistic Approach to Database Self-management," *Proceedings, ICDE Workshops (Self-Managing Database Systems)*, Istanbul, Turkey, pp. 514-523, Apr. 2007.

Codd, E.F., "Extending the Database Relational Model to Capture More Meaning," *ACM Transactions on Database Systems*, vol. 4, No. 4, pp. 397-434, Dec. 1979.

Galindo-Legaria, C.A., "Outerjoins as Disjunctions," *ACM SIGMOD International Conference on Management of Data*, Minneapolis, Minnesota, pp. 348-358, May 1994.

Griffin, T. and Kumar, B., "Algebraic Change Propagation for Semijoin and Outerjoin Queries," *ACM SIGMOD Record*, vol. 27, No. 3, pp. 22-27, 1998.

Larson, P.A. and Zhou, J., "Efficient Maintenance of Materialized Outer-Join Views," *Proceedings, 23rd IEEE International Conference on Data Engineering*, pp. 56-65, 2007.

Nica, A. et al., "Extreme Visualisation of Query Optimizer Search Spaces," *ACM SIGMOD International Conference on Management of Data*, Providence, Rhode Island, pp. 1067-1069, Jun. 2009.

Nica, A., "Immediate Materialized Views with Outerjoins", *ACM International Workshop on Data Warehousing and OLAP (ACM DOLAP)*, ACM Conference of Information and Knowledge Management (*ACM CIKM*) *Workshops*, pp. 45-52, 2010.

Rao, J. et al., "Canonical Abstraction for Outerjoin Optimization," *ACM SIGMOD International Conference on Management of Data*, Paris, France, pp. 671-682, Jun. 2004.

International Search Report and Written Opinion for International Application No. PCT/US2011/046600, Korean Intellectual Property Office, Daejeon, Republic of Korea, mailed on Jan. 17, 2012.

\* cited by examiner

```
 1: SELECT [PR9].[ContactID] AS [ContactID],[PR9].[C1] AS [C1],[PR9].[C2] AS [C2],[PR9].[ContactID1] AS [ContactID1],
 2:        [PR9].[SalesOrderID] AS [SalesOrderID], [PR9].[TotalDue] AS [TotalDue]
 3: FROM
 4: (SELECT [Distinct1].[ContactID] AS [ContactID],1 AS [C1],[PR8].[ContactID] AS [ContactID1],
 5:        [PR8].[SalesOrderID] AS [SalesOrderID],[PR8].[TotalDue] AS [TotalDue],[PR8].[C1] AS [C2]
 6:     FROM (SELECT DISTINCT [EX1].[ContactID] AS [ContactID]
 7:        FROM [Contact] AS [EX1] JOIN [SalesOrderHeader] AS [EX2]
 8:           ON EXISTS (SELECT cast(1 as bit) AS [C1]
 9:              FROM (SELECT cast(1 as bit) AS X ) AS [SingleRowTable1]
10:              LEFT OUTER JOIN (SELECT [EX3].[ContactID] AS [ContactID]
11:                 FROM [Contact] AS [EX3] WHERE [EX2].[ContactID] = [EX3].[ContactID] ) AS [PR1]
12:                 ON cast(1 as bit) = cast(1 as bit)
13:              LEFT OUTER JOIN (SELECT [EX4].[ContactID] AS [ContactID]
14:                 FROM [Contact] AS [EX4] WHERE [EX2].[ContactID] = [EX4].[ContactID] ) AS [PR2]
15:                 ON cast(1 as bit) = cast(1 as bit)
16:              WHERE ([EX1].[ContactID] = [PR1].[ContactID])
17:                 OR (([EX1].[ContactID] IS NULL) AND ([PR2].[ContactID] IS NULL)))
18:        ) AS [Distinct1]
19: LEFT OUTER JOIN
20: (SELECT [EX5].[ContactID] AS [ContactID],[EX6].[SalesOrderID] AS [SalesOrderID],[EX6].[TotalDue] AS [TotalDue],1 AS [
21:     FROM [Contact] AS [EX5]
22:     JOIN [SalesOrderHeader] AS [EX6]
23:        ON EXISTS (SELECT cast(1 as bit) AS [C1]
24:           FROM (SELECT cast(1 as bit) AS X ) AS [SingleRowTable2]
25:           LEFT OUTER JOIN (SELECT [EX7].[ContactID] AS [ContactID]
26:              FROM [Contact] AS [EX7] WHERE [EX6].[ContactID] = [EX7].[ContactID] )AS [PR5]
27:              ON cast(1 as bit) = cast(1 as bit)
28:           LEFT OUTER JOIN (SELECT [EX8].[ContactID] AS [ContactID]
29:              FROM [Contact] AS [EX8] WHERE [EX6].[ContactID] = [EX8].[ContactID] )AS [PR6]
30:              ON cast(1 as bit) = cast(1 as bit)
31:           WHERE ([EX5].[ContactID] = [PR5].[ContactID])
32:              OR (([EX5].[ContactID] IS NULL) AND ([PR6].[ContactID] IS NULL))
33:     ) ) AS [PR8]
34:     ON ([PR8].[ContactID] = [Distinct1].[ContactID])
35:        OR (([PR8].[ContactID] IS NULL) AND ([Distinct1].[ContactID] IS NULL))
36:  ) AS [PR9]
37: ORDER BY [PR9].[ContactID] ASC, [PR9].[C2] ASC
```

FIG. 1

INCREMENTAL MAINTENANCE OF IMMEDIATE MATERIALIZED VIEWS WITH OUTERJOINS

CROSS-REFERENCE TO RELATED APPLICATIONS

The present applications claims the benefit of U.S. provisional application No. 61/371,413, filed on Aug. 6, 2010, and entitled "Incremental Maintenance of Immediate Materialized Views with Outerjoins", which is incorporated herein by reference in its entirety.

FIELD OF THE INVENTION

The present invention is generally directed to database management systems, and, more specifically, to database management systems providing materialized views, incremental maintenance of materialized views and in particular directed to a system and methodology for maintenance of materialized views containing outerjoins.

BACKGROUND OF THE INVENTION

SYBASE™ SQL ANYWHERE™ is an ANSI SQL-compliant relational database management system (RDBMS) designed to run on a variety of platforms from server-class installations to mobile devices using the Windows Mobile operating system. SQL ANYWHERE™ is a self-managing RDBMS with high reliability, high performance, synchronization capabilities, small footprint, and a full range of SQL features across a variety of 32- and 64-bit platforms.

Currently available products, such as SQL ANYWHERE™ support manual materialized views. A manual materialized view, which can only be refreshed by complete re-computation, may be defined by any complex query. However, some query optimizers, such as the SQL ANYWHERE™ Optimizer, can use only a certain class of materialized views in the view matching process during query optimization. Although SQL ANYWHERE™ supports incremental maintenance of certain materialized views for GROUP-SELECT-PROJECT-JOIN views, what is needed is a more general class of materialized views that can be incrementally maintained. Accordingly, what is needed are methods and systems for incremental maintenance for immediate Materialized Views (iMVs). What is further needed is an RDBMS that supports an extended class of immediate materialized views, namely outerjoin views with and without aggregation. In an embodiment of the invention, the algorithms described herein may be implemented in a database or data warehouse system such as, but not limited to, SQL ANYWHERE™.

Outerjoin queries are used more and more frequently in new systems and external tools where database administrators (DBAs) or experienced database developers are not at hand to fine-tune the generated SQL statements. An example of such generated query is depicted in FIG. 1. For example, the SQL ANYWHERE™ Optimizer has sophisticated techniques for processing outerjoin queries from semantics transformations to view matching using outer-join views. It is then a necessity to extend the support to incremental maintenance of materialized views with outerjoins, as this can speed up many of the applications using the SQL ANYWHERE™ RDBMS. The goals for an efficient support of immediate materialized views with outerjoins are multifold.

Some traditional techniques for incremental maintenance of materialized views with outerjoins are based on the join-disjunctive normal form representation. A join-disjunctive normal form encodes an outerjoin query as a sequence of minimum unions of different joins. The example in FIG. 3 shows the parent-child relationship graph corresponding to the join-disjunctive normal form of the query $V_1$ defined in Table 1. Such incremental maintenance algorithm consists of a series of steps: one step for computing and applying the primary delta (not null-supplied tuples), then a set of subsequent steps for applying secondary deltas (null-supplied tuples) to delete or insert null-supplied tuples. The primary delta is saved and reused in the computation of the secondary deltas. This computation may need to access again the base relations in order to correctly compute the null-supplied tuples. As these traditional techniques require a separate SQL statement to implement each of the needed steps, they incur inefficiencies and require resources for parsing and executing multiple SQL statements. For example, for the relation $X_2$ of the view $V_1$ (defined in Table 1) depicted in FIG. 3, the view update algorithm will consist of five steps: computing and applying the primary delta, and computing and applying four secondary deltas corresponding to the join-disjunctive normal form terms $R_1R_2T_1T_2$, $R_1R_2$, $X_1Y_1Y_2$, and $X_1$.

Accordingly, what is needed are methods and systems for incremental maintenance of materialized views with outerjoins through use of a single maintenance update statement for each materialized outer-join view.

BRIEF SUMMARY OF THE INVENTION

The invention includes systems, methods, and computer program products for optimizing queries including outerjoins and materialized views.

In an embodiment of the invention, the Preserved Side/Null Supplied Side (PSNS) algorithm is proposed for incremental maintenance of materialized views with outerjoins. The algorithm enables generation of just a single maintenance update statement for each materialized outerjoin view, which will be used to incrementally update the materialized view when a referenced base table is updated. As this is a usual SQL statement that will be executed by RDBMS, this in turn allows powerful optimizations to be applied while processing the update statements, in order to achieve better performance.

Secondly, as the generated SQL statement computes in the same time not-null-supplied tuples and null-supplied tuples, this allows an extended class of immediate materialized views to be supported, due to fewer restrictions being imposed on the definitions of the views.

Thirdly, since only one update statement is used, no intermediate temporary tables need to be saved during a view update operation. This also brings a substantial improvement in performance as compared to traditional solutions.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art to make and use the invention.

FIG. 1 provides an example of a generated outerjoin query generated by an Object-Relational mapping system.

Figure 7:
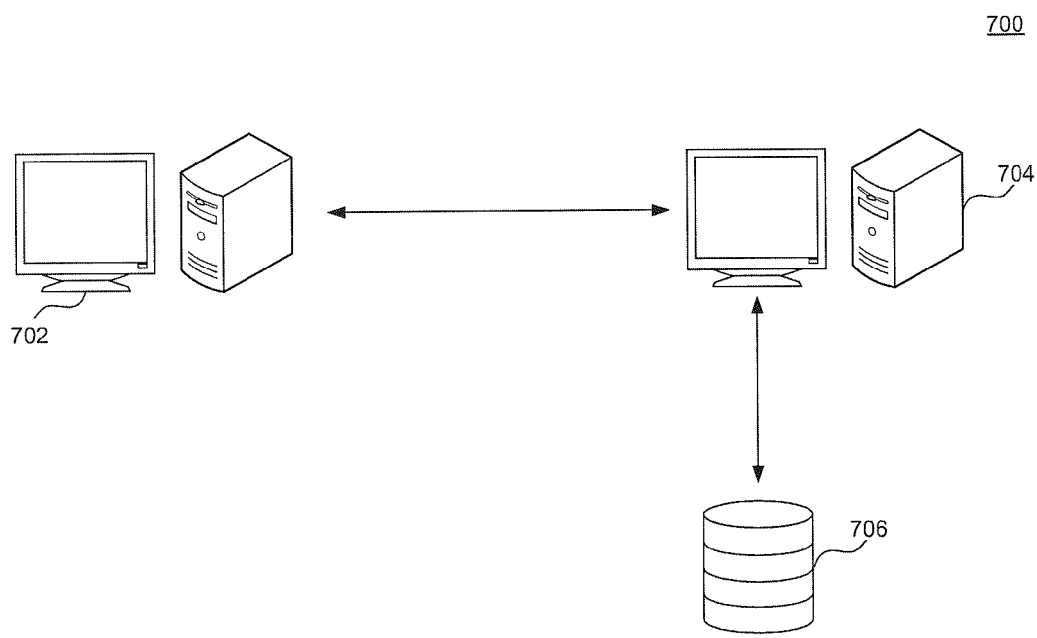

FIG. 7 provides a modular view of a system in which the present invention may be implemented.

Figure 8:
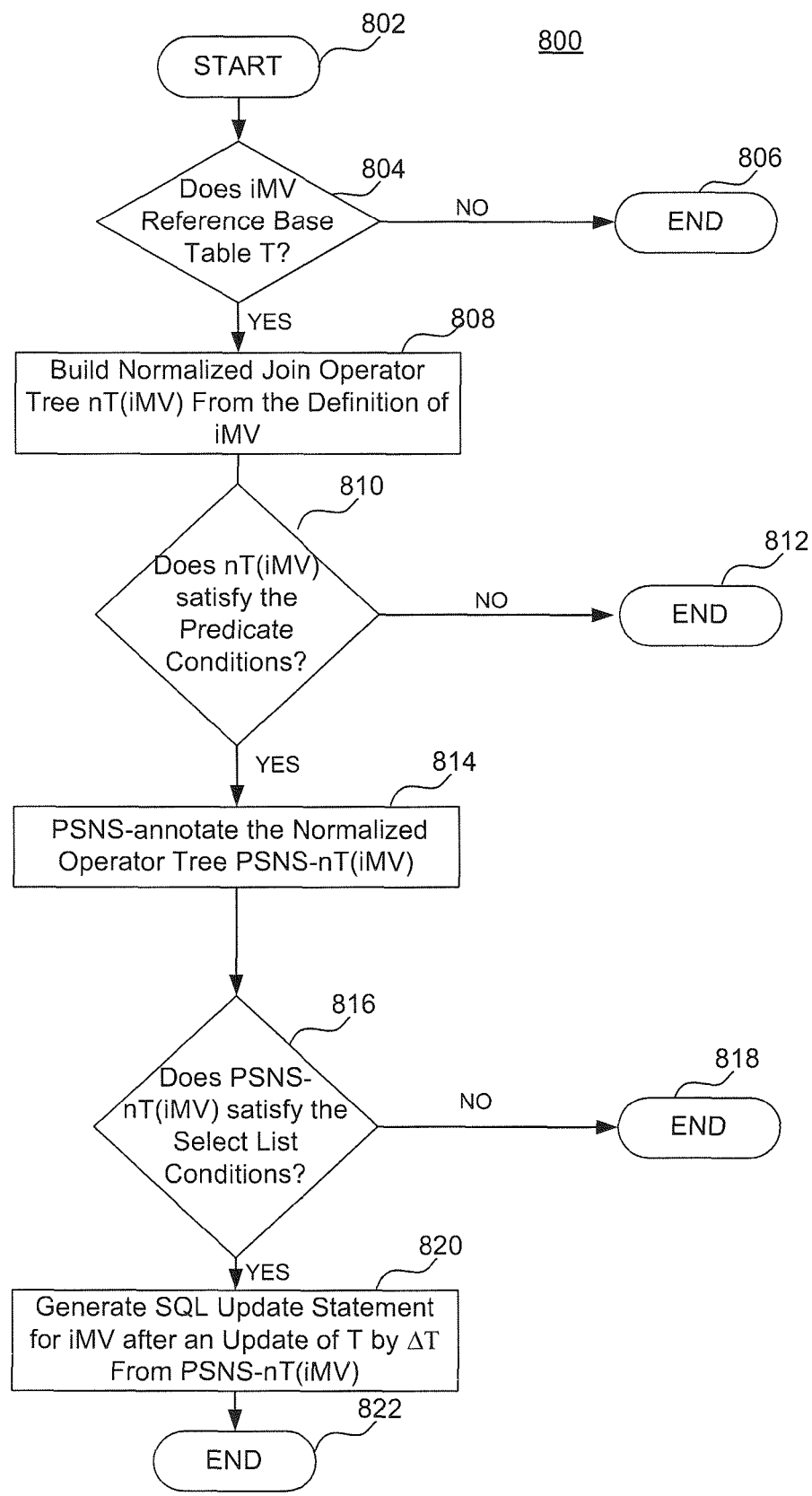
Figure 9:
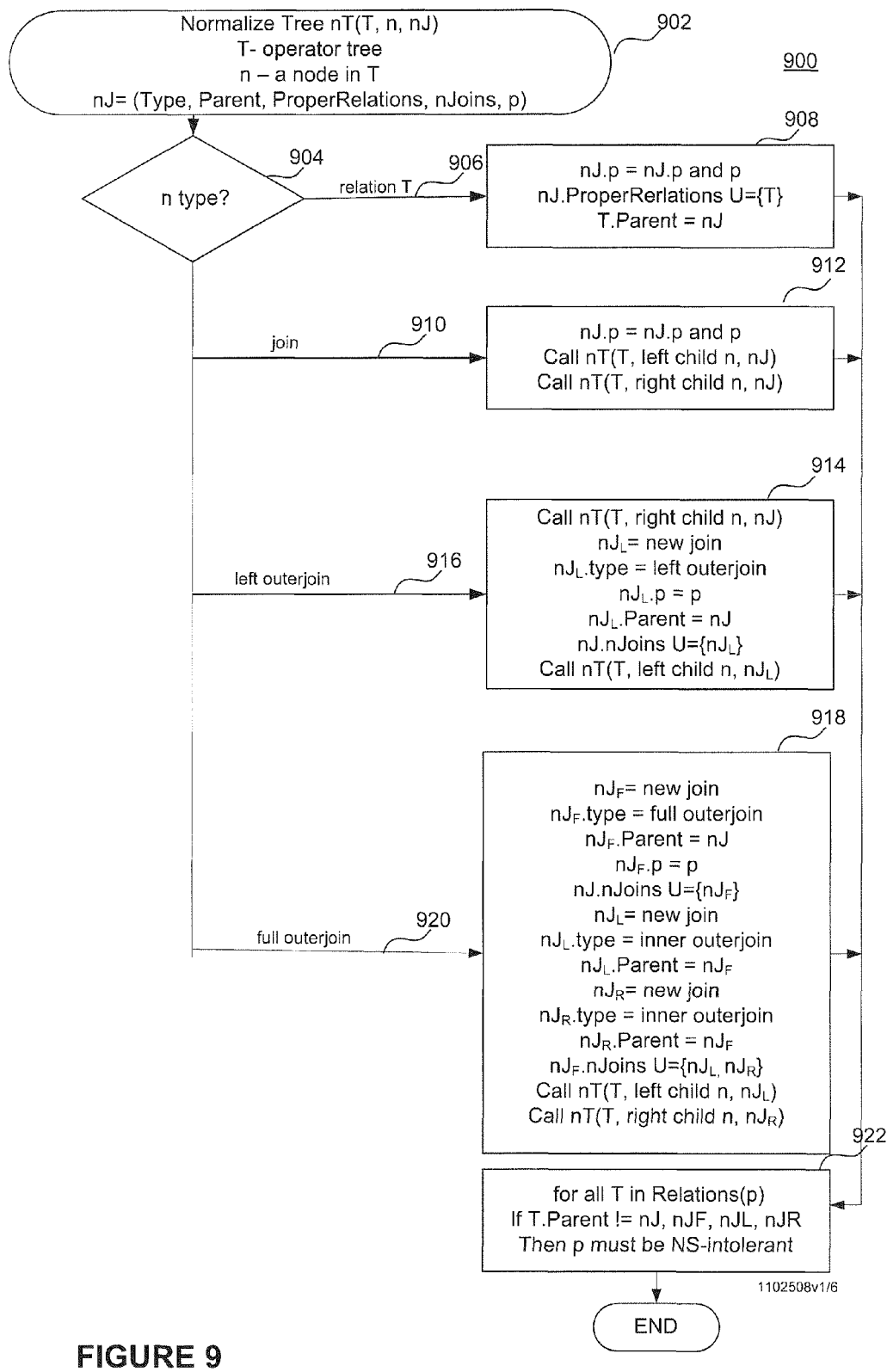

FIGS. 8 and 9 are flowcharts illustrating steps by which the generated update statements are created from the PSNS-annotated normalized join operator trees built for immediate materialized views (iMVs) with outerjoins, in accordance with embodiments of the present invention.

Figure 10:
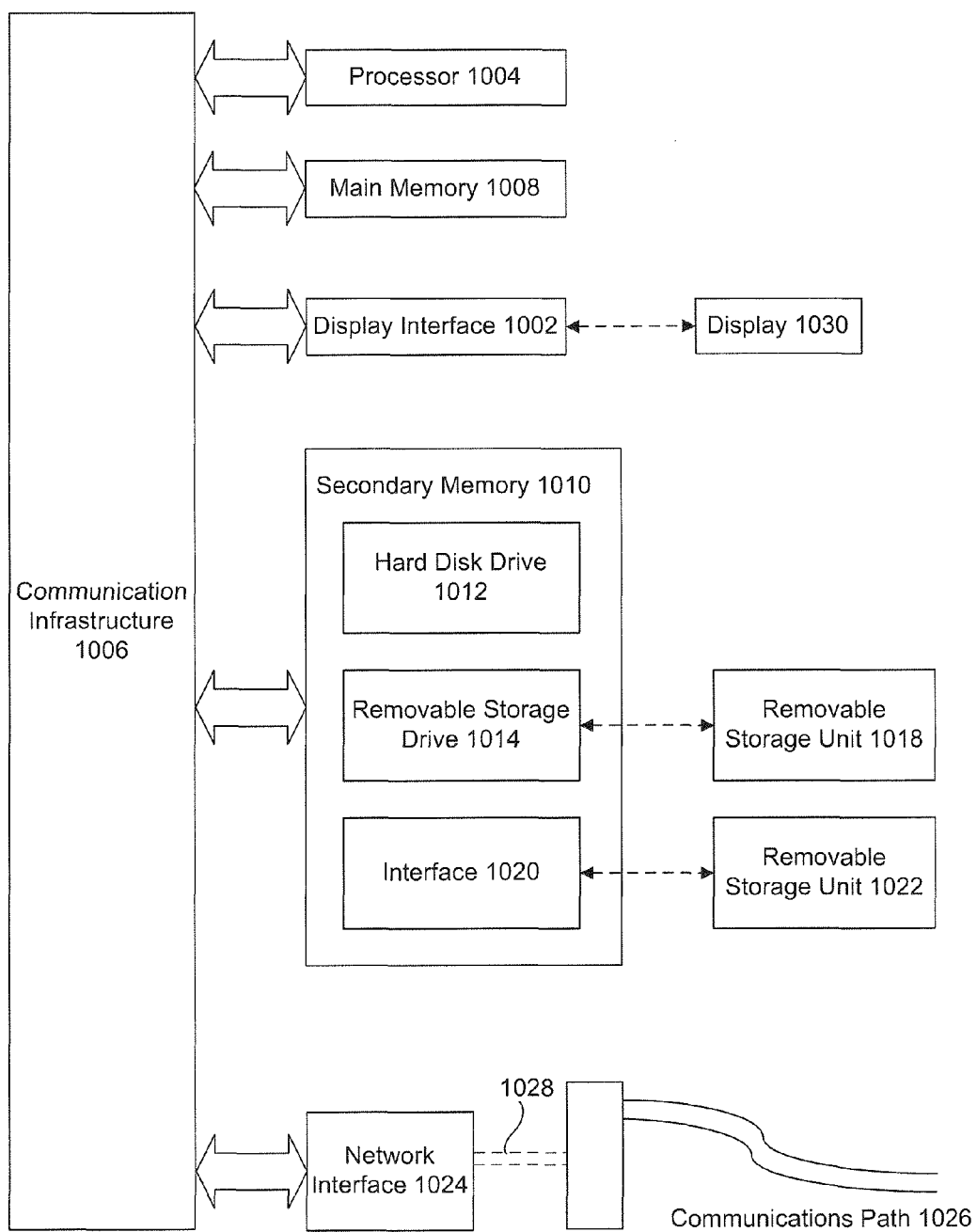

FIG. 10 depicts an example computer system in which the present invention may be implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Introduction

The present invention relates to system, method, computer program product embodiments, and combinations and subcombinations thereof for incrementally update immediate materialized views (iMVs) with outerjoins.

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

The present invention relates to systems, methods, and computer program products for implementing algorithms for incrementally update immediate materialized views (iMVs) with outerjoins.

According to an embodiment of the invention, the algorithms can be integrated with a query optimizer that supports materialized views, such as, but not limited to, the SQL ANYWHERE™ Optimizer. The update of iMVs can be achieved using internally generated triggers, one for each relation referenced in an iMV. Internally generated triggers contain update statements which, given a ΔT update relation representing the updated rows of a based table T, perform updates to the iMVs that reference T in their definition. In an embodiment, the update statements are SQL statements internally generated which are processed and optimized by the query optimizer just like any other query taking full advantage of query optimization techniques present in any query optimizer. Hence, the incremental maintenance of iMVs with outerjoins can be done in a similar fashion, which is achieved via MERGE/INSERT/UPDATE statements, in accordance with an embodiment. One of skill in the relevant arts will appreciate that other programming languages, database platforms, and technologies can be used to implement the logic and algorithms discussed herein.

Secondly, given the current landscape of the applications using a RDBMS server, the restrictions imposed to the class of the outerjoin views which can be immediately maintained have to be kept to a minimum. Traditional solutions are very restrictive with respect to the content of the select list and the null-intolerant properties imposed to the predicates. Embodiments of the invention described herein improve upon traditional methods by relaxing null-intolerant property restrictions (i.e., by being null-tolerant).

Thirdly, the extra information needed by the new generation algorithms for outerjoin update statements is efficiently added to internal representation of the outerjoin query blocks used by a query optimizer, such as, but not limited to, the SQL ANYWHERE™ Optimizer.

The Algorithm PSNS ( ) described herein achieves exactly that.

GLOSSARY AND NOMENCLATURE

The following definitions are offered for purposes of illustration, not limitation, in order to assist with understanding the discussion that follows.

Join: A join clause combines records from two or more tables, such as, but not limited to, database tables. As used herein, in an embodiment, a database may be one or more of a relational database, an in-memory database, a file system, a collection of web server documents, files, or resources, or any collection of electronic data.

Outerjoin: An outerjoin is a join that does not require each record in the two joined tables to have a matching record. The joined table retains each record, even in cases where no other matching record exists. Outerjoins may be left outerjoins, right outerjoins, or full outerjoins—depending on which table(s) one preserves the rows from (left, right, or both).

Relation: A relation is defined as a set of tuples (rows) that have the same attributes (columns).

Relational Database: A relational database is a collection of data stored in relations (sometimes called tables). The relational database was invented by E. F. Codd at IBM in 1970.

Structured Query Language (SQL): SQL: SQL stands for Structured Query Language. The original version called SEQUEL (structured English query language) was designed by IBM in the 1970's. SQL-2008 is the latest standard for SQL as set out in a document published by the International Standards Organization in 2008; see e.g., "SQL Foundation" published in July 2008.

Schema(T): Schema(T) denotes all the attributes (columns) of a relation T, Schema(T)={$A_1, \ldots, A_n$}

Tuple: A tuple t over the Schema(T) is an assignment of values to attribute names of Schema(T), t=$a_1, \ldots, a_n$). t[$A_i$]= $a_i$, denotes the value of tuple t for the attribute $A_i$. An instance of the relation T is a set of tuples defined over the attributes in the Schema(T), T={$t_1, \ldots, t_k$}. For a tuple t defined over the schema of the relations $T_1, \ldots, T_i$ the notation $t[T_i]$ denotes the values of the tuple t for the attributes of the relation $T_i$. The notation n(t[T]) denotes that all attributes in the Schema(T) have Null in the tuple t, while nn(t[T]) denotes that at least one attribute in the Schema(T) is not Null. Also, $t=(\ldots, n(T), \ldots, nn(R) \ldots)$ indicates that the tuple t is Null on T, i.e., n(t[T]), and not-null on R, i.e., nn(t[R]).

Schema(p): As used herein, in an embodiment, a predicate p is defined over a set of attributes identified by Schema(p). The notation $p(T_1, T_2, \ldots, T_n,)$ denotes a predicate referencing some attributes of the relations $T_1, T_2, \ldots, T_n$, i.e., Schema(p)$\subset \cup_{i=1,n}$ Schema($T_i$), and Relations(p)={$T_1$, $T_2 \ldots, \overline{T_n}$}. A predicate p applied to the tuples $t_1 \in T_1$, $t_2 \in T_2, \ldots, t_n \in T_n$ can have three values False, True or Unknown. When applicable, the notation $p(t_1, \ldots, t_n)$ will denote that the predicate p evaluates to True and $p(t_1, \ldots, t_n)$<>True when the predicate evaluates to False or Unknown.

Outerunion: As used herein, in an embodiment, the term outerunion of the two relations $T_1$ and $T_2$ is denoted by $T_1 \uplus T_2$, and it is computed by first padding the tuples of each relation $T_i$, i=1, 2 with Null for the attributes in (Schema($T_1$)$\cup$ Schema($T_2$))\Schema($T_i$), and then computing the union of the resulting sets.

Join, antijoin, left, right, and full outerjoins: For two relations $T_1$ and $T_2$ the join, antijoin, left, right, and full outerjoins are defined as following, respectively:

$$R\bowtie_{p(R,T)} T = \{(r, t) \mid r \in R, t \in T, p(r, t) = \text{True}\}$$

$$R\triangleright_{p(R,T)} T = \{r \mid r \in R, (\not\exists t \in T)(p(r, t) = \text{True})\}$$

$$R\stackrel{lo}{\bowtie}_{p(R,T)} T = (R\bowtie_{p(R,T)} T) \uplus (R\triangleright_{p(R,T)} T)$$

$$R\stackrel{ro}{\bowtie}_{p(R,T)} T = T\stackrel{lo}{\bowtie}_{p(R,T)} R$$

$$R\stackrel{fo}{\bowtie}_{p(R,T)} T = (R\bowtie_{p(R,T)} T) \uplus (R\triangleright_{p(R,T)} T) \uplus (T\triangleright_{p(R,T)} R)$$

null-supplied tuple: A tuple for which all attributes of a relation T are null-padded or null-extended is denoted by T-null-supplied tuple.

null-supplied tuple: A tuple for which at least one attribute of a relation T is not null is denoted by T-null-supplied tuple.

Dominating tuple: A tuple t dominates a tuple r if they are defined on the same schema, and t[A]=r[A], $\forall A \in$ Schema(t) for which r[A] is not null.

Duplicate tuple: t and r are tuples defined on the same schema. If $\forall A \in$ Schema(t), t[A] is not distinct from r[A], i.e., they are both Null or they are equal, then t is a duplicate of r.

Best match operator: The best match operator 13 as defined to be $\beta(R)=\{r \mid r \in R$, r is not dominated or a duplicate by any tuple in R and it has at least one non null value}. Best match operator applied to a relation R eliminates all tuples which are dominated by or duplicates of other tuples, hence $\beta(R)$ has no two tuples which dominate each other or are duplicates.

Duplicate Elimination operator: $\delta(R)$ for the duplicate elimination operator: $\delta(R)=\{r \mid r \in R$, r is not a duplicate of any tuple in R}.

Strong predicate: A predicate p is strong if it does not evaluate to True if any of the attribute in Attributes(p) has value Null.

NS-intolerant predicate: A predicate $p(T_1, \ldots, T_n)$ is NS-intolerant on a relation $T \in \{T_1, \ldots, T_n\}$ if the predicate doesn't evaluate to True for tuples which are T-null-supplied. The distinction between a NS-intolerant predicate and a strong predicate is a that the strong predicate p is required to be null-intolerant on any attribute in Schema(p). For example, T.X IS NOT DISTINCT FROM R.X[1] AND rowid(T) IS NOT NULL is not a strong predicate but it is NS-intolerant on the relation T according to NS-intolerant definition: T.X can be NULL but still the predicate can evaluate to True. In our experience, a large class of customer queries do not use strong predicates even in the ON clauses as it is the case with the query from FIG. 1 (for example, the ON predicates from lines 16-17, 34-35). When the property of a predicate to be NS-intolerant for a certain relation $T_i$ is important, it is denoted by underlying the relation $T_i$ e.g., $p(T_1, \ldots, \underline{T_i}, \ldots, T_n)$.

[1]The IS NOT DISTINCT FROM predicate was introduced in ANSI SQL: 1999 and it is equivalent to the predicate T.X=R.X OR (T.X IS NULL AND R.X IS NULL).

Logical operator tree: The logical operator tree is a representation of a query where internal nodes are binary joins while leaves are relations. Each node in a logical operator tree may have a predicate referencing relations from left and right subtrees Outerjoin query: As used herein, in an embodiment, the teem outerjoin query is a query which contains left and full outerjoins (the right outerjoins can be transformed into left outerjoins), and inner joins. An outerjoin query can be represented by a join operator tree whose internal nodes are binary joins and the leaves are relations.

Null-supplying outerjoin: For an internal join node of a join operator tree of type left outerjoin, it is said that the outerjoin null-supplies the relations from its right hand side. For a full outerjoin node, the outerjoin null-supplies both its sides. Note that in an outerjoin query, the same base relation can be null-supplied by more than one outerjoin.

Direct outerjoin: For any relation T in an outerjoin query represented by an operator tree, the direct outerjoin of T is the first ancestor node of type left outerjoin or full outerjoin which null-supplies T. Any relation T can have at most one direct outerjoin.

Indirect outerjoin: For any relation T in an outerjoin query represented by an operator tree, an indirect outerjoin is an outerjoin node which null-supplies T but it is not the direct outerjoin of T.

Materialized View with Outerjoin: A materialized view whose definition is an outerjoin query is a materialized view with outerjoins with and without aggregation functions.

In an embodiment, incrementally maintained materialized views with outerjoins are assumed to have the following properties regarding the predicates used in the view definition. The predicate of an outerjoin J is an NS-intolerant predicate only on a relation, which has a direct outerjoin, and this direct outerjoin is different than J. NS-intolerant property imposed on some of the outerjoin predicates assures the null-supplying rippling effect: if a relation T is null-supplied by its direct outerjoin, then all its indirect outerjoins must also null-supply their whole null-supplying sides. Hence, any tuple generated by an outerjoin query having T null-supplied will have all related relations null-supplied as well. For example, for the outerjoin query $$\left(R\stackrel{lo}{\bowtie}_{p,(R,T)} T\right)\stackrel{fo}{\bowtie}_{p(\underline{T},S)}$$

S the above condition requires that only the predicate $p(\underline{T}, S)$ of the full outerjoin $$\stackrel{fo}{\bowtie}_{p(\underline{T},S)}$$

is NS-intolerant on the relation T which can be null-supplied by its direct left outerjoin R $$\underset{p(R,T)}{\overset{lo}{\bowtie}} T.$$

The predicate $$\underset{p,(R,T)}{\overset{lo}{\bowtie}}$$

does not have to be NS-intolerant as the rippling effect doesn't hold for the other outerjoin $$\underset{p(T,S)}{\overset{fo}{\bowtie}}. \quad \underset{p(T,S)}{\overset{fo}{\bowtie}}$$

will null-supply both relations R and T or none, hence it has no impact on the result of the left outerjoin $$R \underset{p,(R,T)}{\overset{lo}{\bowtie}} T.$$

In an embodiment, it is assumed that the materialized view has a unique index with nulls not distinct on attributes that maybe null. For example, if the unique index is defined on the attributes (A, B), two tuples (α, Null) and (α, Null) are considered equals and cannot exist in the same time in the view because they violate the uniqueness of the index. Extra requirements for the immediate materialized views with outerjoins will be discussed later when the PSNS algorithm is described.

PSNS—Preserved Side/Null Supplied Side Algorithm

For a given outerjoin query which defines an immediate materialized view V, the proposed algorithms find a representation of the null-supplied properties of a base relation T that will give the correct formula for an update statement for the view V after update operations on the relation T. The main goal is to impose as few restrictions as possible to the view definition, and also the view update statement to be very efficient and perform incremental maintenance of the materialized view V.

The assumption is that the relation T being updated is null-supplied by at least one outerjoin in the view definition[2]. If the view V references a set of relations $T_1, T_2, \ldots, T_n$ and the relation T, for an instance of the relations $T_1, \ldots, T_n$ and T, $V(nn(T))=\{t\mid t\in V(T, T_1, T_2, \ldots, Tn), nn(t[T])\}$ denotes the set of all tuples in the instance $V(T, T_1, T_2, \ldots, T_n)$ which are not null-supplying the relation T (T-null-supplied). V(nn(T)) can be computed by using the original view definition where all outerjoins which null-supply T are transformed into inner or left outerjoin such that T is no longer null-supplied.

[2] For relations that cannot be null-supplied by an outerjoin, the view update statements are similar to the formulas for innerjoin immediate materialized views.

For example, if $$V_3 = \left(R \underset{p(R,T)}{\overset{fo}{\bowtie}} T\right) \underset{p(T,S)}{\overset{fo}{\bowtie}} S, \quad V_3(nn(T)) = \left(R \underset{p(R,T)}{\overset{ro}{\bowtie}} T\right) \underset{p(T,S)}{\overset{lo}{\bowtie}} S.$$

V(n(T)) denotes the set of all T-null-supplied tuples in the instance $V(T, T_1, \ldots, T_n)$.

The maximum set of the T-null-supplied tuples in V, denoted by Null $(T, V(T, T_1, T_2, \ldots, T_n))$, as the set of all possible T-null-supplied tuples in any instance of the view V computed over the fix relations $T_1, T_2, \ldots, T_n$ and any instance of the relation T. I.e., Null$(T, T_1, T_2, \ldots, T_n)= \delta(\cup_{any\ instance\ of\ T} V(n(T))))$. As used herein, in embodiments of the invention, the assumption is that, for a materialized view V, only one relation is updated and all others referenced by the view are left unchanged. Hence, whenever possible, the simplified notations are used where the fix relations are not mentioned, e.g., Null $(T, V)$=Null $(T, V(T1, T_1, T_2, \ldots, T_n)$, and $V(T, T_1, T_2, \ldots, T_n)=V(T)$. Null $(T, V)$ can be obtained by using the original view definition where the relation T is replaced by empty set (i.e., Null $(T, V)=V(T \rightarrow \phi)$). In the previous example, $$\text{Null }(T, V_3) = \left(R \underset{p(R,T)}{\overset{fo}{\bowtie}} \varphi\right) \underset{p(T,S)}{\overset{fo}{\bowtie}} S.$$

Null $(T, V)$ contains all possible T-null-supplied tuples which can be present in V regardless of the content of T. In other words, for any instance of the relation T, any T-null-supplied tuple in V is present in Null $(T, V)$ as long as the content of all other base relations is unchanged, i.e., $V(n(T)) \subset$ Null $(T, V)$. In the previous example, if $R=\{r_0, r_1\}$, $S=\{s_0\}$, any T-null-supplied tuple that can exist in $V_3$ is one of the following tuples:

Null $(T, V)=\{(r_0, \text{Null}, \text{Null}), (r_1, \text{Null}, \text{Null}). (\text{Null}, \text{Null}, s_0)\}$.

For incremental maintenance of the materialized views with outerjoins, it is known, for each insert or delete operation on the relation T using the set $\Delta T$, what are the tuples to be inserted or deleted from V(nn(T)). This set, denoted by V(nn($\Delta T$)) can be obtained by using $\Delta T$ in the definition of V(nn(T)) instead of T. However, each such operation can have a side effect related to the T-null-supplied tuples. For a delete operation on T, deleting tuples from V, namely, V(nn($\Delta T$)), may leave the view V in need of new T-null-supplied tuples. Furthermore, inserting new tuples in V, namely V(nn($\Delta T$)), may leave some spurious old tuples in V which are now dominated by new tuples in V(nn($\Delta T$)). The term NS-compensation is used to describe the operation of inserting or deleting T-null-supplied tuples in V, after V was updated using V(nn($\Delta T$)).

The goal is to design an algorithm having the following properties: (1) for each tuple $t \in V(nn(\Delta T))$, compute, in the same time with the computation of V(nn($\Delta T$)), the set of potential T-null-supplied tuples, Null (t, T, V), without accessing the view V. Null (t, T, V) is actually the set of all tuples dominated by t in Null(T, V). Null (t, T, V) will be used for NS-compensation after the insert, delete, or update operations; (2) for each tuple $t' \in$Null (t, T, V), decide, using the view V, if t' is to be deleted (for insert and update operations) or inserted (for delete and update operations) into V to NS-compensate for the inserted and deleted tuples from V(nn($\Delta T$)). (3) there is no need to save partial deltas into temporary tables, hence a single statement should be used for both the update operation using V(nn($\Delta T$)) and NS-compensation using Null ($\Delta T, T, V$).

The algorithm PSNS (Algorithm 2 in Table 4) computes, for each base relation T, a set PSNS (T) (Preserved Sides/Null-supplied Sides) which is a set of pairs of subsets ($ps_i$, $ns_i$), $ps_i$, $ns_i$, $\in$Relations (V) where each such pair describes exactly one T-null-supplied tuple, Null (i, t, T, V), which can be obtained from a tuple $t \in V(nn(\Delta T))$. Moreover, a pair ($ps_i$, $ns_i) \notin PSNS(T)$ provides the condition used to check the need for using the tuple Null (i, t, T, V) for NS-compensation of V. The set $ns_i$ contains all the relations in Relations(V) which has to be null-supplied together with T in the tuple Null (i, t, T, V). The set $ps_i$ represents all the relations which are preserved in the tuple Null (i, t, T, V). Of course, the tuple Null (i, t, T, V) can exist if and only if the original tuple t does not null-supply the relations in $ps_i$. The values for the rest of relations in don'tcare(i,T,V)=Relations(V)\(ns_i \cup ps_i)$ are left unchanged in Null (i, t, T, V). Any tuple Null (i, t, T, V) is dominated by the tuple t, hence they cannot both exist in the view V in the same time.

The formal definitions for the set Null (i, t, T, V), Null (t, T, and Null ($\Delta$T, T, V) are given by:

$$don'tcare(i,T,V)=Relations(V)\backslash(ns_i \cup ps_i).$$

$$Null(i,t,T,V)==(t[don'tcare(i,T,V)],t[ps_i],n(T),n(ns_i))$$

$$Null(t,T,V)=\cup_{(psi,nsi) \in PSNS(T)nn(t[psi])}Null(i,t,T,V)$$

$$Null(\Delta T,T,V)=\cup_{t \in V(nn(\Delta T))}Null(t,T,V) \quad \text{Equation (1):}$$

Note that the set Null (t, T, V) doesn't contain duplicates or spurious tuples as each pair (ps, ns) $\in$PSNS (T) produces a distinct tuple, i.e, Null (t, T, V)=$\delta$(Null (t, T, V)). However, the set Null ($\Delta$T, T, V) may contain duplicates since two distinct tuples in $\Delta$T may produce the same T-null-supplied tuple. It can be proven that if V has all the properties required by PSNS algorithm, Null (T, V) as defined above is obtained by the formula in the Equation 2. In other words, all the T-null-supplied tuples can be computed from any instance of the view V:

$$Null(T,V)=V(T \to \phi, T_1, T_2, \ldots, T_n)$$

$$=\delta(\cup_{any\ instance\ of\ T, t \in V(nn(T))}Null(T,V)) \quad \text{Equation (2):}$$

Figure 3:
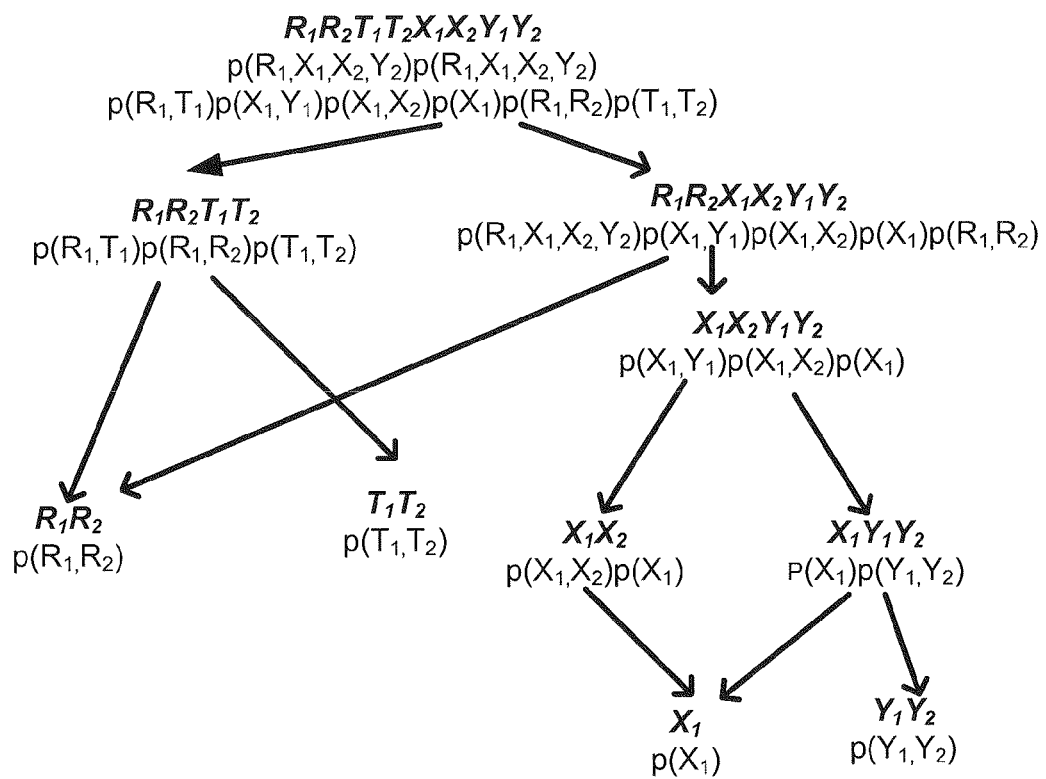
FIG. 3 illustrates a parent-child relationship graph corresponding to the join-disjunctive normal form of the view $V_1$ (defined in Table 1).

For an example, consider the view $V_1$, defined in Table 1 and FIG. 3, and the relation $X_2$ being updated with $\Delta X_2$. For a tuple $t \in V(nn(\Delta X_2))$ it is known that $t[X_2]$ must be not null (the set $(V(nn(\Delta X_2))$ contains only $X_2$-null-supplied): $t=(r_1, r_2, t_1, t_2, x_1, x_2, y_1, y_2)$. The set PSNS $(X_2)$ is computed to be $\{(\{X_1\}, \{R_1, R_2, T_1, T_2, X_2\}), (\{R_1\}, \{X_1, X_2, Y_1, Y_2\})\}$. Intuitively, the first $(ps_1, ns_1)=(\{X_1\}, \{R_1, R_2, T_1, T_2, X_2\})$ represents the $X_2$-null-supplied tuples where the relation $X_1$ is to be preserved. As $X_2$ is null-supplied in Null $(1,t,X_2,V_1)$, $X_1$ is to be preserved, and the predicate $p(r_1, x_1, Null, y_2)$ <>True for the full outerjoin $s_0^{fo}$, then the other side of the full outerjoin is null-supplied as well beside $X_2$. This explains why $ns_1=\{R_1, R_2, T_1, T_2, X_2\}$ is exactly the other side of the full outerjoin $S_0^{fo}$. If $t[X_1]=x_1$ is not null, then Null (1, t, $X_2$, $V_1$)=(Null, Null, Null, Null, $x_1$, Null, $y_1$, $y_2$) with $y_1$ and $y_2$ left the same as for tuple t. $y_1$ and $y_2$ can be null or non-null values and the computation of Null (1, t, $X_2$, $V_1$) is independent of their values. Similarly, Null (2, t, $X_2$, $V_1$)=($r_1, r_2, t_1, t_2$, Null, Null, Null, Null) if $t[R_1]=r_1$ is not null. The preserved relation in Null (2, t, $X_2$, $V_1$) is $R_1$, and the values $r_2, t_1, t_2$ are left unchanged from t. However, the full outerjoin $s_0^{fo}$ null-supplies the whole right hand side as the predicate $p(r_1, x_1,$ Null, $y_2$)<>True. If the update operation on the relation $X_2$ is an insert, if the tuple Null (i, t, $X_2$, $V_1$) exists in V, it will be deleted as it is a spurious tuple being dominated by the new tuple t. If the update operation is a delete, the tuple Null (i, t, $X_2$, $V_1$) can be used for NS-compensation if, after the delete of $V(nn(\Delta T))$ from V, no tuple has the value $t[ps_i]$ in V, i.e., $\nexists t' \in V, t'[ps_i]=t[ps_i]$.

Figure 2:
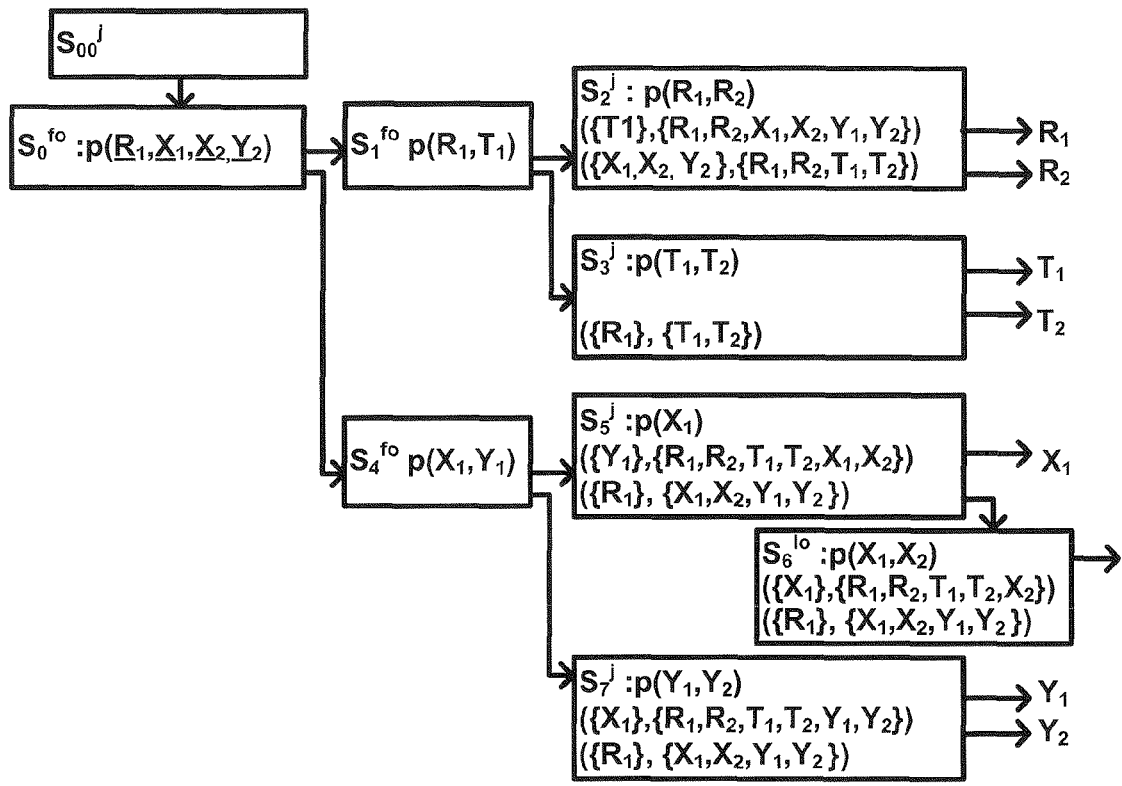
FIG. 2 depicts the PSNS-annotated normalized join operator tree, for the view $V_1$ (defined in Table 1) in accordance with an embodiment of the present invention.

The Algorithm 2 describe in Table 4 computes the PSNS ( ) sets for each base relation in an outerjoin immediate materialized view V. The algorithm is using as input a normalized join operator tree, which is a compact representation of a query operator tree where the outerjoins, which could be unnested, were 'flattened' in the same subplan. An example of such normalized operator tree is provided in FIG. 2. PSNS-annotated normalized join operator tree was designed to support the optimization of the statements with outerjoins in a query optimizer, including, but not limited to, the SQL ANYWHERE™ Optimizer. The main property of a normalized join is that its relations are all null-supplied together by the direct or indirect outside outerjoins. For example, in FIG. 3, the normalized join $s_1^{fo}$ representing the table expression $$\left((R_1 \bowtie_{p(R_1,R_2)} R_2) \bowtie^{fo}_{p(R_1,T_1)} (T_1 \bowtie_{p(T_1,T_2)} T_2)\right),$$

can be all null-supplied by the outerjoin $$\bowtie^{fo} p(\underline{R_1}, \underline{X_1}, X_2, Y_2).$$

Intuitively, a subplan represents, as a set of relations, atomic null-supplying sides of outerjoins. In an embodiment, the algorithm PSNS ( ) uses the postorder traversal of the normalized join operator tree and computes, for each subplan S, based on the predicates used for outerjoins, the (ps, ns)$\in$PSNS (S) sets. ns are sets of other relations, which are null-supplied if S is null-supplied. ps are sets of preserved relations, which are preserved if S is null-supplied. After the PSNS algorithm is applied, the PSNS-annotated normalized join operator tree contains all the metadata needed to generate, for any relation T$\in$Relations(V), the update statements used for the incremental maintenance of the materialized view V. FIG. 3 shows the final PSNS sets for each subplan $S_i^x$ where x$\in$\{lo, fo, j\}. In the section below, embodiments are described with reference to Tables 1-4 wherein PSNS ( ) sets are used to generate the update statements for immediate materialized views.

TABLE 1

PSNS-annotated Normalized Join Tree for $V_1$ $$V_1 = \left((R_1 \bowtie_{p(R_1,R_2)} R_2) \bowtie^{fo}_{p(R_1,T_1)} (T_1 \bowtie_{p(T_1,T_2)} T_2)\right) \bowtie^{fo}_{p(\underline{R_1},\underline{X_1},\underline{X_2},\underline{Y_2})} \left(\left(\sigma_{p(X_1)} X_1 \bowtie^{lo}_{p(X_1,X_2)} X_2\right) \bowtie^{fo}_{p(X_1,Y_1)} (Y_1 \bowtie_{p(Y_1,Y_2)} Y_2)\right)$$

| | |
|---|---|
| PSNS ($R_1$) = PSNS ($R_2$) = | $\{(\{T_1\}, \{R_1, R_2, X_1, X_2, Y_1, Y_2\}), (\{X_1, X_2, Y_2\}, \{R_1, R_2, T_1, T_2\})\}$ |
| PSNS ($T_1$) = PSNS ($T_2$) = | $\{(\{R_1\}, \{T_1 T_2\})\}$ |
| PSNS ($X_1$) = | $\{(\{Y_1\}, \{R_1, R_2, T_1, T_2, X_1, X_2\}), (\{R_1\}, \{X_1, X_2, Y_1, Y_2\})\}$ |
| PSNS ($X_2$) = | $\{(\{X_1\}, \{R_1, R_2, T_1, T_2, X_2\}), (\{R_1\}, \{X_1, X_2, Y_1, Y_2\})\}$ |
| PSNS ($Y_1$) = PSNS ($Y_2$) = | $\{(\{X_1\}, \{R_1, R_2, T_1, T_2, Y_1, Y_2\}), (\{R_1\}, \{X_1, X_2, Y_1, Y_2\})\}$ |
| (P2) NS-intolerant: | $p(\underline{R_1}, \underline{X_1}, \underline{X_2}, \underline{Y_2})$ on $R_1, X_1, X_2, Y_2$ |
| (P3) pk in select list: | $\overline{R_1}, \overline{T_1}, \overline{X_1}, \overline{X_2}, \overline{Y_1}, Y_2$ |
| (P4) nn ( ), n( ) in select list: | $R_1, T_1, X_1, X_2, Y_1$ |

TABLE 2

PSNS-annotated Normalized Join Trees Examples $$V_2 = \left(R \overset{lo}{\bowtie}_{p(R,T)} T\right) \overset{fo}{\bowtie}_{p(T,S)} S$$

| | |
|---|---|
| PSNS (R) = | $\{(\{S\}, \{R,T\})\}$ |
| PSNS (T) = | $\{(\{R\}, \{T, S\}), (\{S\}, \{R, T\})\}$ |
| PSNS (S) = | $\{(\{T\}, \{S\})\}$ |
| (P2) NS-intolerant: | $p(\underline{T}, S)$ on T |
| (P3) pk | R, S, T |
| (P4) nn( ), n( ) | R, S, T |

$$V_3 = \left(R \overset{fo}{\bowtie}_{p(R,T)} T\right) \overset{fo}{\bowtie}_{p(T,S)} S$$

| | |
|---|---|
| PSNS (R) = | $\{(\{T\}, \{R\})\}$ |
| PSNS (T) = | $\{(\{R\}, \{T, S\}), (\{S\}, \{R, T\})\}$ |
| PSNS (S) = | $\{(\{T\}, \{S\})\}$ |
| (P2) NS-intolerant: | $p(\underline{T}, S)$ |
| (P3) pk | T, R, S |
| (P4) nn( ), n( ) | T, R, S |

$$V_4 = \left(R_1 \overset{lo}{\bowtie}_{p(R,T,S)} \left(S \bowtie_{p(T,S)} T\right)\right) \bowtie_{p(R_1,R_2)} R_2$$

| | |
|---|---|
| PSNS ($R_1$) = PSNS ($R_2$) = | ∅ |
| PSNS (T) = PSNS (S) = | $\{(\{R_1\}, \{T, S\})\}$ |
| (P2) NS-intolerant: | none |
| (P3) pk | $R_1$ |
| (P4) nn( ), n( ) | only one of the relations T, S |

$$V_5 = R \overset{lo}{\bowtie}_{p(R,S)} \left(S \overset{lo}{\bowtie}_{p(T,S)} T\right)$$

| | |
|---|---|
| PSNS (R) = | ∅ |
| PSNS (S) = | $\{(\{R\}, \{T, S\})\}$ |
| PSNS (T) = | $\{(\{S\}, \{T\})\}$ |
| (P2) NS-intolerant: | none |
| (P3) pk | R, S |
| (P4) nn( ), n( ) | S, T |

$$V_6 = \left(R \overset{lo}{\bowtie}_{p(R,S)} S\right) \overset{lo}{\bowtie}_{p(R,T)} T$$

| | |
|---|---|
| PSNS (R) = | ∅ |
| PSNS (S) = | $\{(\{R\}, \{S\})\}$ |
| PSNS (T) = | $\{(\{R\}, \{T\})\}$ |
| (P2) NS-intolerant: | none |
| (P3) pk | R |
| (P4) nn( ), n( ) | S, T |

$$V_7 = \left(R \overset{fo}{\bowtie}_{p(R,T)} T\right) \overset{fo}{\bowtie}_{p(T,S)} \left(S \overset{lo}{\bowtie}_{p(S,W)} W\right)$$

| | |
|---|---|
| PSNS (R) = | $\{(\{T\}, \{R\})[\text{don't care} = \{S, W\}]\}$ |
| PSNS (T) = | $\{(\{R\}, \{T, S, W\})[\text{don't care} = ∅], (\{S\}, \{R, T\})[\text{don't care} = \{W\}]\}$ |
| PSNS (S) = | $\{(\{T\}, \{S, W\})[\text{don't care} = \{R\}]\}$ |
| PSNS (W) = | $\{(\{S\}, \{W\})[\text{don't care} = \{R, T\}]\}$ |
| (P2) NS-intolerant: | $p(\underline{T}, S)$ |
| (P3) pk | T, R, S |
| (P4) nn( ), n( ) | T, R, S, W |

TABLE 3

Algorithm 1 - Build Normalized Join Tree

1: Procedure: Build a normalized operator tree from $\mathcal{T}$
2: Input: $\mathcal{T}$, a node n, and a direct parent n $\mathcal{J}$ = (Dn $\mathcal{J}$, DRels = $\{T_1, \ldots, T_n\}$, n $\mathcal{J}$s = $\{n \mathcal{J}_1, \ldots, n \mathcal{J}_m\}$, p)

$$\text{Rels}(n\mathcal{J}) \overset{def}{=} \text{DRels} \cup_i \text{Rels}(n\mathcal{J}_i)$$

3: All semantic transformations, such as join elimination, outerjoin to innerjoin transformations, predicate push-down were already applied to the operator tree $\mathcal{T}$
4: n $\mathcal{J}_L$ = Null, n $\mathcal{J}R$ = Null, n $\mathcal{J}_P$ = Null
5: if n is a relation T with predicate p: then
6:     n $\mathcal{J} \cdot p = n \mathcal{J} \cdot p \wedge p$, n $\mathcal{J} \cdot \text{DRels} \cup = \{T\}$, T · Dn $\mathcal{J}$ = n $\mathcal{J}$
7:     return
8: if n is an inner join with predicate p: then
9:     n $\mathcal{J} \cdot p = n \mathcal{J} \cdot p \wedge p$
10:     call n $\mathcal{T}$ ( $\mathcal{T}$, left child of n, n $\mathcal{J}$)
11:     call n $\mathcal{T}$ ( $\mathcal{T}$, right child of n, n $\mathcal{J}$)
12:     goto check_predicates
13: if n is a left outerjoin with predicate p: then
14:     call n $\mathcal{T}$ ( $\mathcal{T}$, left child of n, n $\mathcal{J}$)
15:     n $\mathcal{J}_L$ = new normalized join of type left outerjoin
16:     n $\mathcal{J}_L \cdot$ Dn $\mathcal{J}$ = n $\mathcal{J}$, n $\mathcal{J} \cdot$ n $\mathcal{J}$s$\cup$ = $\{n \mathcal{J}_L\}$, n $\mathcal{J}_L \cdot p = p$
17:     call n $\mathcal{T}$ ( $\mathcal{T}$, right child of n, n $\mathcal{J}_L$)
18     goto check_predicates
19: if n is a full outerjoin with predicate p: then
20:     n $\mathcal{J}_F$ = new normalized join of type full outerjoin
21:     n $\mathcal{J}_F \cdot$ Dn $\mathcal{J}$ = n $\mathcal{J}$, n $\mathcal{J} \cdot$ n $\mathcal{J}$s$\cup$ = $\{n \mathcal{J}_F\}$, n $\mathcal{J}_F \cdot p = p$
22:     n $\mathcal{J}_L$ = new normalized join of type outerjoin
23:     n $\mathcal{J}_L \cdot$ Dn $\mathcal{J}$ = n $\mathcal{J}_F$
24:     n $\mathcal{J}_R$ = new normalized join of type outerjoin
25:     n $\mathcal{J}_R \cdot$ Dn $\mathcal{J}$ = n $\mathcal{J}_F$
26:     n $\mathcal{J}_F \cdot$ n $\mathcal{J}$s = $\{n \mathcal{J}_L, n \mathcal{J}_R\}$
27:     call n $\mathcal{T}$ ( $\mathcal{T}$, left child of n, n $\mathcal{J}_L$)
28:     call n $\mathcal{T}$ ( $\mathcal{T}$, right child of n, n $\mathcal{J}_R$)
29:     goto check_predicates TABLE 3-continued Algorithm 1 - Build Normalized Join Tree

| | |
|---|---|
| 30: | (check_predicates: /* (P1) p must refer to both left and right child of n, and Rels(p) ⊆ Rels(n $\mathcal{J}$) (P2) p must be NS-intolerant: on T ∈ Rels(p) iff n is not the direct outerjoin of T */ |
| 31: | for all T ∈ Rels(p) : do |
| Require: | If Dn $\mathcal{J}$(T) ∉ {n $\mathcal{J}$, n $\mathcal{J}_L$, n $\mathcal{J}_R$} then p must be NS-intolerant on T. |

TABLE 4

Algorithm 2 - Build PSNS-annotated Normalized Join Tree

| | |
|---|---|
| 1: | Procedure: Compute PSNS( ) (Preserved Side / Null-supplied Side) sets for the normalized join |
| 2: | n $\mathcal{J}$ = (Dn $\mathcal{J}$, DRels, n $\mathcal{J}$s, p) ∈ n $\mathcal{T}$ ($\overline{V}$) $\quad$ PSNS(T) $\stackrel{def}{=}$ PSNS(Dn$\mathcal{J}$(T)) |
| 3: | RULE 0: /* If n $\mathcal{J}$ is null-supplied in a tuple t, then all its relations must be null-supplied in t */ |
| 4: | PSNS (n $\mathcal{J}$) = {(∅, Rels(n $\mathcal{J}$))} |
| 5: | for all n $\mathcal{J}$' ∈ n $\mathcal{J}$s(n $\mathcal{J}$) do |
| 6: | $\quad$ PSNS (n $\mathcal{J}$') |
| 7: | for all T ∈ Rels(p) do |
| 8: | $\quad$ if n $\mathcal{J}$ type is left outerjoin then |
| 9: | $\quad\quad$ RULE 1: /* (T ...) ⋈$_{p(T,...)}^{lo}$ (n $\mathcal{J}$): T is the preserved side of left outerjoin n $\mathcal{J}$. If T is null-supplied in a tuple t then n $\mathcal{J}$ must be all null-supplied in t as well since the predicate p cannot evaluate to True (rippling effect): */ |
| 10: | $\quad\quad$ if T ∉ Rels(n $\mathcal{J}$) then |
| 11: | $\quad\quad\quad$ UnionNS (n $\mathcal{J}$, T) |
| 12: | $\quad\quad$ RULE 2: /* ... ⋈$_{p(T,...)}^{lo}$(T ... ): T is in the null-supplying side of the left outerjoin n $\mathcal{J}$. The relations in Rels(p) \ Rels(n $\mathcal{J}$) must be preserved if n $\mathcal{J}$ is null-supplied: */ |
| 13: | $\quad\quad$ if T ∈ Rels(n $\mathcal{J}$) then |
| 14: | $\quad\quad\quad$ for all (ps, ns) ∈ PSNS (n $\mathcal{J}$) do |
| 15: | $\quad\quad\quad\quad$ ps ∪ = Rels(p) \ Rels(n $\mathcal{J}$) |
| 16: | $\quad$ if n $\mathcal{J}$ type is full outerjoin then |
| 17: | $\quad\quad$ /* n $\mathcal{J}$s (n $\mathcal{J}$) = {n $\mathcal{J}_L$, n $\mathcal{J}_R$} */ |
| 18: | $\quad\quad$ if T ∈ Rels(n $\mathcal{J}_L$) then |
| 19: | $\quad\quad\quad$ (n $\mathcal{J}_1$, n $\mathcal{J}_2$) = (n $\mathcal{J}_L$, n $\mathcal{J}_R$) |
| 20: | $\quad\quad$ if T ∈ Rels(n $\mathcal{J}_R$) then |
| 21: | $\quad\quad\quad$ (n $\mathcal{J}_1$, n $\mathcal{J}_2$) = (n $\mathcal{J}_R$, n $\mathcal{J}_L$) |
| 22: | $\quad\quad$ RULE 3: /* If T is null-supplied by an outerjoin other than this full outerjoin, the n $\mathcal{J}_2$ must be null-supplied as well since the predicate p cannot evaluate to True (rippling effect): */ |
| 23: | $\quad\quad$ for n $\mathcal{J}$' = Dn $\mathcal{J}$ (T)n $\mathcal{J}$' ≠ n $\mathcal{J}$ n $\mathcal{J}$' = Dn $\mathcal{J}$ (n $\mathcal{J}$') do |
| 24: | $\quad\quad\quad$ UnionNS (n $\mathcal{J}_2$, n $\mathcal{J}$') |
| 25: | $\quad\quad$ RULE 4: /* The relations in n $\mathcal{J}_2$ must be preserved if n $\mathcal{J}_1$ is null-supplied: */ |
| 26: | $\quad\quad$ for n $\mathcal{J}$' = Dn $\mathcal{J}$ (T)n $\mathcal{J}$' ≠ n $\mathcal{J}$ n $\mathcal{J}$' = Dn $\mathcal{J}$ (n $\mathcal{J}$') do |
| 27: | $\quad\quad\quad$ ns = {n $\mathcal{J}_1$} |
| 28: | $\quad\quad\quad$ ps = (Rels(n $\mathcal{J}_2$) ∩ Rels(p)) |
| 29: | $\quad\quad\quad$ PSNS (n $\mathcal{J}$') ∪ = {(ps, ns)} |
| | /* check_selectlist: Check restrictions on the select list of the view $\overline{V} = \pi_{v_1,...,v_k}V$: (P3) Any relation in a ps$_i$ set must have a primary key, and the primary key attributes must be among the select list expressions (P4) For any normalized join n $\mathcal{J}$ in a ns$_i$ set, the predicates nn(n $\mathcal{J}$) and n(n $\mathcal{J}$) must be generated using the select list expressions. */ |
| 30: | for all R ∈ Rels(n $\mathcal{T}$ ($\overline{V}$)), (ps, ns) ∈ PSNS (R): do |
| 31: | $\quad$ for all T ∈ ps: do |
| Require: | T has primary key T · pk = {C$_1$, ..., C$_j$} ⊆ {v$_1$, ..., v$_k$} /* The predicate ∧$_{1 \leq i \leq j}$(V · C$_i$ = $\overline{V(\Delta T)}$ · C$_i$) is needed. */ |
| 32: | $\quad$ for all n $\mathcal{J}$ ∈ ns: do |
| Require: | ∃S ∈ DRels(n $\mathcal{J}$) and S · C = C ∈ {v$_1$, ..., v$_k$} a not-null attribute /* The predicates n($\overline{V}$ · C) and nn($\overline{V}$ · C): $\overline{V}$ · C IS [NOT] NULL are needed. */ |

Example Implementation

According to an embodiment, materialized views which can be incrementally maintained or used in the query optimization process are represented internally as PSNS-annotated normalized join operator trees (nT) which can be the same representation used by a cost-based query optimizer such as, but not limited to, the SQL ANYWHERE™ Optimizer. nT is built after semantic transformations and query analysis are applied to the original query operator tree. Both the view matching algorithm and the generation of the update statements for the incremental maintenance of the materialized views are using nT representing the definition of the views.

In an embodiment, for an immediate materialized view, the PSNS-annotated nT is built at the first reference to the view since the server was started. If a relation T is updated, an internally generated trigger is created containing all the update statements for any immediate materialized view referencing the relation T. This section describes some of the update statements generated for these internal triggers for iMVs with outerjoins. Each update statement is a SQL statement, which can be an INSERT, UPDATE, or MERGE statement. The update statements are generated from the PSNS-annotated nT representation of the materialized views. The execution of an internally generated trigger is done after any update operation on the relation T when ΔT is passed on to the trigger. Each generated update statement is processed like any other SQL query, hence all the optimizations supported in a query optimizer such as exploitation of foreign key constraints, outer and inner join elimination are applied to find efficient execution plans. The generation algorithm is designed to produce correct up-date statements, which can be efficiently optimized by a query optimizer, such as, but not limited to, the SQL ANYWHERE™ Optimizer. In an exemplary embodiment of the invention, the techniques described herein are implemented in SQL ANYWHERE™ 12.0.

The operations sections below describe the SQL statements generated for iMVs with outerjoins. In all the statements, the derived table $\tilde{V}(nn(\Delta T))$ is equivalent to $V(nn(\Delta T))$ but preserves all the columns needed to compute the select list of $V(nn(\Delta T))$ as well as tuples in Null $(\Delta T, T, V)$. Note that complex expressions of the select list in Null$(\Delta T, T, V)$ cannot be computed directly from $V(nn(\Delta T))$ as columns needed maybe projected out in the final select list. For the delete and update operations, $V(nn(\Delta T))$ is applied by using the unique index which the materialized view must have. The condition V.ui IS NOT DISTINCT FROM $V(nn(\Delta T))$.ui (see line 22 in Table 6 describing INSERT operation, and line 24 in Table 9 describing the UPDATE operation) contains all the IS NOT DISTINCT FROM predicates applied to the columns of the unique index. For the delete and update operations, the MATCHED clause. In an embodiment, the MERGE statement processes first the spurious tuples which are deleted by the WHEN MATCHED clause (Table 6, line 24) (this is the NS-compensation operation). The rows from $V(nn(\Delta T))$ are inserted next by the WHEN NOT MATCHED clause (Table 6, lines 25-26). Table 5 below depicts exemplary logic for computing an applying Null(i, t, T, V) for INSERT operations. Table 6 below provides an exemplary MERGE SQL statement for INSERT operations, in accordance with an embodiment of the invention.

TABLE 5

Compute and apply Null(i, t, T, V) for INSERT operation

1:   for all $t \in V(nn(\Delta T))$ do
Ensure: nn(t[T])
2:       for all i such that $(ps_i, ns_i) \in PSNS(T)$, $ps_i \neq \emptyset nn(t[ps_i])$ do
3:           /* Generate T-null-supplied tuple in Null(i,t,T,V) */
4:           Null(i,t,T,V) =
5:           = $(t.[Rels(V) \setminus ns_i], n(ns_i))$
6:           $\overline{Null(i,t,T,V)}$ =
7:           = $(v_1(Null(i,t,T,V)),...,v_k(Null(i,t,T,V)))$
             /* $\overline{Null(i,t,T,V)} \in \overline{V}$ iff $\overline{V}.ps_i = t[ps_i]$ AND $n(\overline{V}.s_i)$ */
8:           if $\overline{Null(i,t,T,V)} \in \overline{V}$ then
9:               $\overline{V} = \overline{V} \setminus \{\overline{Null(i,t,T,V)}\}$ // delete $\overline{Null(i,t,T,V)}$

TABLE 6

MERGE statement for INSERT operation

1:   MERGE INTO $\overline{V}$ USING
2:   ( WITH $V(nn(\Delta T))$ AS
3:       (SELECT *, $\Delta T.DML\_type$ FROM $V(nn(\Delta T))$)
4:   SELECT DT.*
5:   FROM $V(nn(\Delta T))$, LATERAL (
     /* ¬T-null-supplied : $\overline{V(nn(\Delta T))}$ to be inserted */
6:   SELECT $v_1(V(nn(\Delta T))),...,v_k(V(nn(\Delta T)))$,
7:   $V(nn(\Delta T)).DML\_type$ AS DML_type Null AS d_rowid
8:   UNION ALL
     /* T-null-supplied : Null(1,t,T,V) for NS-compensation(delete) */
9:   SELECT Null AS $v_1$,...,Null AS $v_k$,
10:          $V(nn(\Delta T)).DML\_type * (-1)$ AS DML_type,rowid($\overline{V}$) d_rowid
11:  FROM $\overline{V}$ WHERE $\overline{V}.ps_1 = V(nn(\Delta T)).ps_1$ AND $n(\overline{V}.ns_1)$
12:  UNION ALL
13:  ...
14:  UNION ALL
     /* T-null-supplied : Null(m,t,T,V) for NS-compensation(delete) */
15:  SELECT Null AS $v_1$,...,Null AS $v_k$,
16:          $V(nn(\Delta T)).DML\_type * (-1)$AS DML_type, rowid($\overline{V}$) d_rowid
17:  FROM $\overline{V}$ WHERE $\overline{V}.ps_m = V(nn(\Delta T)).ps_m$ AND $n(\overline{V}.ns_m)$
18:  ) AS DT
19:  ) AS $\Delta V(\Delta T)$
20:  ON DML_type = -1 AND rowid($\overline{V}$) = $\Delta V(\Delta T)$.d_rowid
21:  WHEN MATCHED THEN DELETE
22:  WHEN NOT MATCHED AND DML_type = +1
23:  THEN INSERT computation of Null $(\Delta T, T, V)$ is done after $V(nn(\Delta T))$ is applied to the view. This is achieved by using embedded DELETE (see lines 18-23, Table 8 describing DELETE operation) and MERGE (lines 21-32, Table 9 describing UPDATE operation) statements, respectively.

INSERT Operation (Table 5, Table 6)

According to an embodiment, for an insert operation, the computation of the set Null$(\Delta T, T, V)$ can see the view data before $V(nn(\Delta T))$ is applied, as the spurious T-null-supplied tuples are present in the view before the insert operation. Hence, the MERGE statement computes $V(nn(\Delta V))$ (Table 6, lines 7-8) in the same time with the Null $(\Delta T, T, V)$ (Table 6, lines 9-20). For efficiency, only rowids of the tuples found in $V \cap Null(\Delta T, T, V)$ are passed to be processed by the WHEN DELETE Operation (Table 7, Table 8)

According to an embodiment, for the delete operation, the computation of the set Null$(\Delta T, T, V)$ must see only the view data after $V(nn(\Delta T))$ is applied, such that a tuple Null (i, t, T, V) is generated only if it is needed for the NS-compensation operation.

Hence, in an embodiment, the INSERT statement first computes (Table 8, line 21) and applies (Table 8, line 18) $V(nn(\Delta T))$. An embedded DELETE statement (Table 8, lines 18-23) is used for computing and applying $V(nn(\Delta T))$. (The embedded update statements (also known as select-from-DML) are executed first, hence the rest of the query sees only the modified data, in our case, the modified view after $V(nn(\Delta T))$ was applied.) The rest of the INSERT statement will see the modified data of the view V when the conditions for NS-compensation are checked (Table 8, lines 9 and 16).

The set Null($\Delta T$, T, V) is computed after the DELETE statement (Table 8, lines 5-17) and the tuples in Null ($\Delta T$, T, V) are inserted into the view (this is the NS-compensation operation).

TABLE 7

Compute and apply Null(i, t, T, V) for DELETE operation

```
1:      for all t ∈ V(nn(ΔT)) do
Ensure: nn(t[T])
2:          for all i such that (ps_i, ns_i) ∈ PSNS(T), ps_i ≠ ∅, ns_i ≠ ∅,
            nn(t[ps_i]) do
3:              // Generate T-null-supplied tuple in Null(i,t,T,V)
4:              Null(i,t,T,V) =
5:              = (t.[Rels(V) \ ns_i],n(ns_i))
6:              Null(i,t,T,V) =
7:              = (v_1(Null(i,t,T,V)),...,v_k(Null(i,t,T,V)))
8:              if σ_{T.ps_i=t[ps_i]}V = ∅ then
9:                  V = V ∪ {Null(i,t,T,V)} // insert Null(i,t,T,V)
```

TABLE 8

INSERT statement for DELETE operation

```
1:   INSERT INTO V
2:       ( WITH V(nn(ΔT)) AS
3:       (SELECT * FROM V(nn(ΔT))
4:   SELECT DISTINCT Null(ΔT,T,V).*
5:   FROM V(nn(ΔT)), LATERAL (
6:       {T-null-supplied : Null(1,t,T,V) for NS-compensation (insert)}
7:       SELECT v_1(Null(1,t,T,V)),...,v_k(Null(1,t,T,V))
8:       WHERE nn(V(nn(ΔT)).ps_1) AND
```

TABLE 8-continued

INSERT statement for DELETE operation

```
9:           NOT EXISTS(SELECT 1 FROM V
                 WHERE V.ps_1 = V(nn(ΔT)).ps_1)
10:      UNION ALL
11:      ...
12:      UNION ALL
13:      {T-null-supplied : Null(m,t,T,V) for NS-compensation (insert)}
14:      SELECT v_1(Null(m,t,T,V)),...,v_k(Null(m,t,T,V))
15:      WHERE nn(V(nn(ΔT)).ps_m) AND
16:          NOT EXISTS(SELECT 1 FROM V
                 WHERE V.ps_m = V(nn(ΔT)).ps_m)
17:      ) AS Null(ΔT,T,V)
18:      , (SELECT FIRST 1 FROM DELETE V
19:      FROM V(nn(ΔT)), LATERAL (
20:      { ¬T-null-supplied : V(nn(ΔT)) to be deleted}
21:      SELECT v_1(V(nn(ΔT))),...,v_k(V(nn(ΔT)))) AS V(nn(ΔT))
22:      WHERE V.ui IS NOT DISTINCT FROM V(nn(ΔT)).ui
23:      )REFERENCING( )) AS ZZ
```

UPDATE Operation (Table 9)

In accordance with an embodiment of the invention, for the update operation, a MERGE statement is used. As with the delete operation, in an embodiment, the computation of the set Null($\Delta T$, T. V) must see only the view data after V(nn($\Delta T$)) is applied, such that a tuple Null(i, t, T, V) is generated only if it is needed for the NS-compensation operation. Hence, an embedded MERGE statement (Table 9, lines 21-32) first computes (Table 9, line 22) and applies (Table 9, line 28-30) V(nn($\Delta T$)). The rest of the MERGE statement will see the modified data of the view V when the conditions for NS-compensation are checked (Table 9, lines 10 and 16). The set Null($\Delta T$, T, V) is processed by the WHEN [NOT] MATCHED clauses (Table 9, lines 35-37).

TABLE 9

MERGE statement for UPDATE operation

```
1:   MERGE INTO V USING
2:       ( WITH V(nn(ΔT)) AS
3:       (SELECT *, ΔT.DML_typeFROM V(nn(ΔT)))
4:   SELECT v_1(DT),...,v_k(DT), DT.DML_type FROM (
5:   SELECT DISTINCT DT_nulls.* FROM V(nn(ΔT)), LATERAL (
     /* T-null-supplied : Null(1,t,T,V) for NS-compensation(insert) */
6:       SELECT v_i(Null(1,t,T,V)),...,v_k((Null(1,t,T,V))
7:       V(nn(ΔT)).DML_type * (−1)AS DML_type Null AS d_rowid
8:       WHERE nn(V(nn(ΔT)).ps_1) AND DML_type = +1 AND
9:           NOT EXISTS ( SELECT 1 FROM V WHERE V.ps_1 = V(nn(ΔT)).ps_1)
10:      UNION ALL
     /* T-null-supplied : Null(1,t,T,V) for NS-compensation(delete) */
11:      SELECT Null AS v_1,...,Null AS v_k
12:      V(nn(ΔT)).DML_type * (−1)AS DML_type,rowid(V) AS d_rowid
13:          FROM V WHERE DML_type = −1 AND
14:              V.ps_1 = V(nn(ΔT)).ps_1 AND n(V.ns_1)
15:      UNION ALL
16:      ...
17:      ) AS DT_nulls
18:      ) AS DT,
19:      , (SELECT FIRST 1 FROM ( MERGE INTO V USING (
20:      select v_1(DT),...,v_k(DT), DT.DML_type FROM (
     /* ¬T-null-supplied : V(nn(ΔT)) to be updated, inserted .or deleted */
21:      SELECT * FROM V(nn(ΔT))
22:      )AS DT
23:      )AS V(nn(ΔT))
24:      ON V.ui IS NOT DISTINCT FROM V(nn(ΔT)).ui
25:      WHEN MATCHED AND DML_type=+1 THEN
         UPDATE
26:      WHEN MATCHED AND DML_type=−1 THEN
         DELETE
27:      WHEN NOT MATCHED AND DML_type=+1 THEN
         INSERT
28:      )REFERENCING( )) AS ZZ
29:      ) AS Null(ΔT,T,V)
```

TABLE 9-continued

MERGE statement for UPDATE operation

Figure 5:
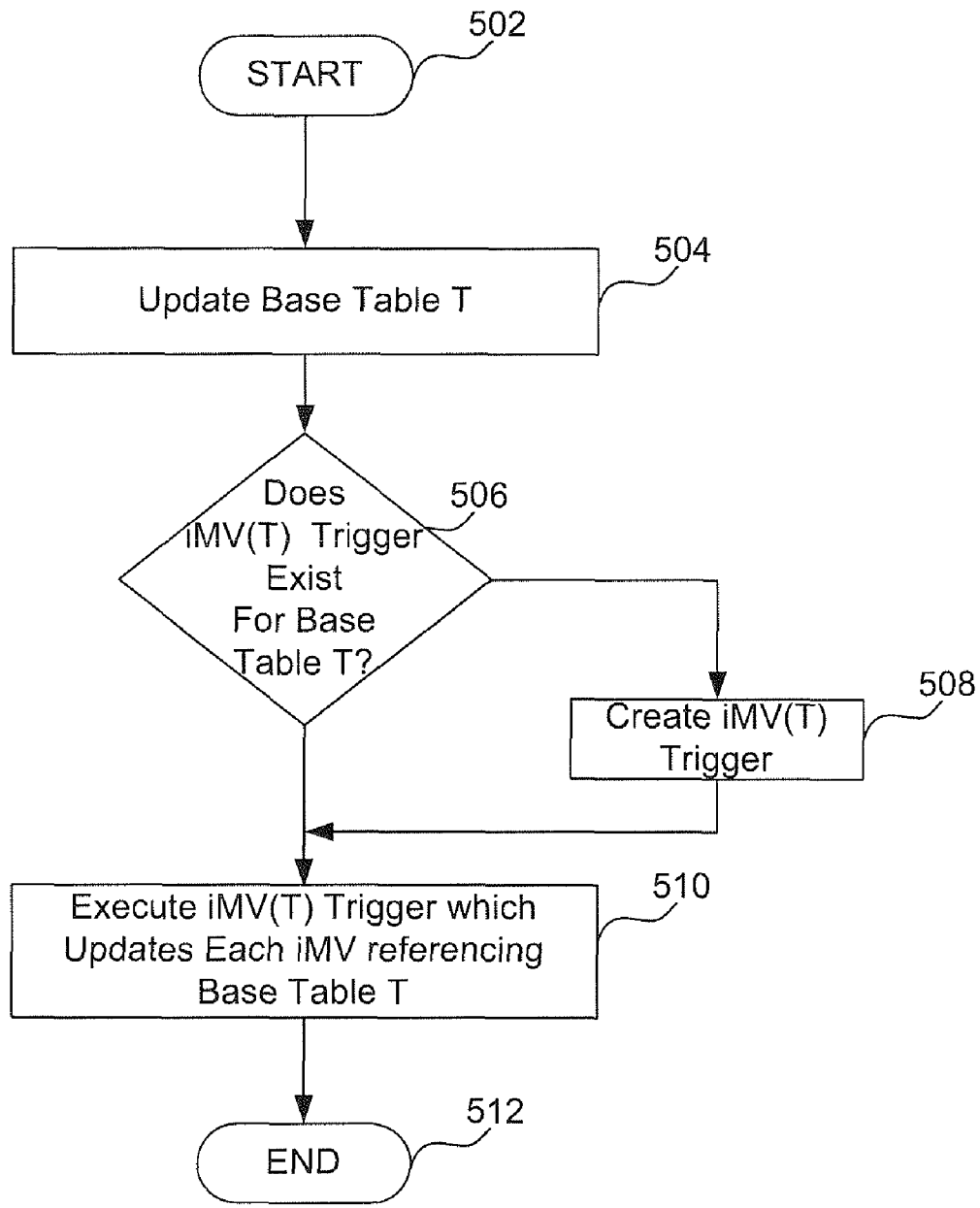
Figure 6:
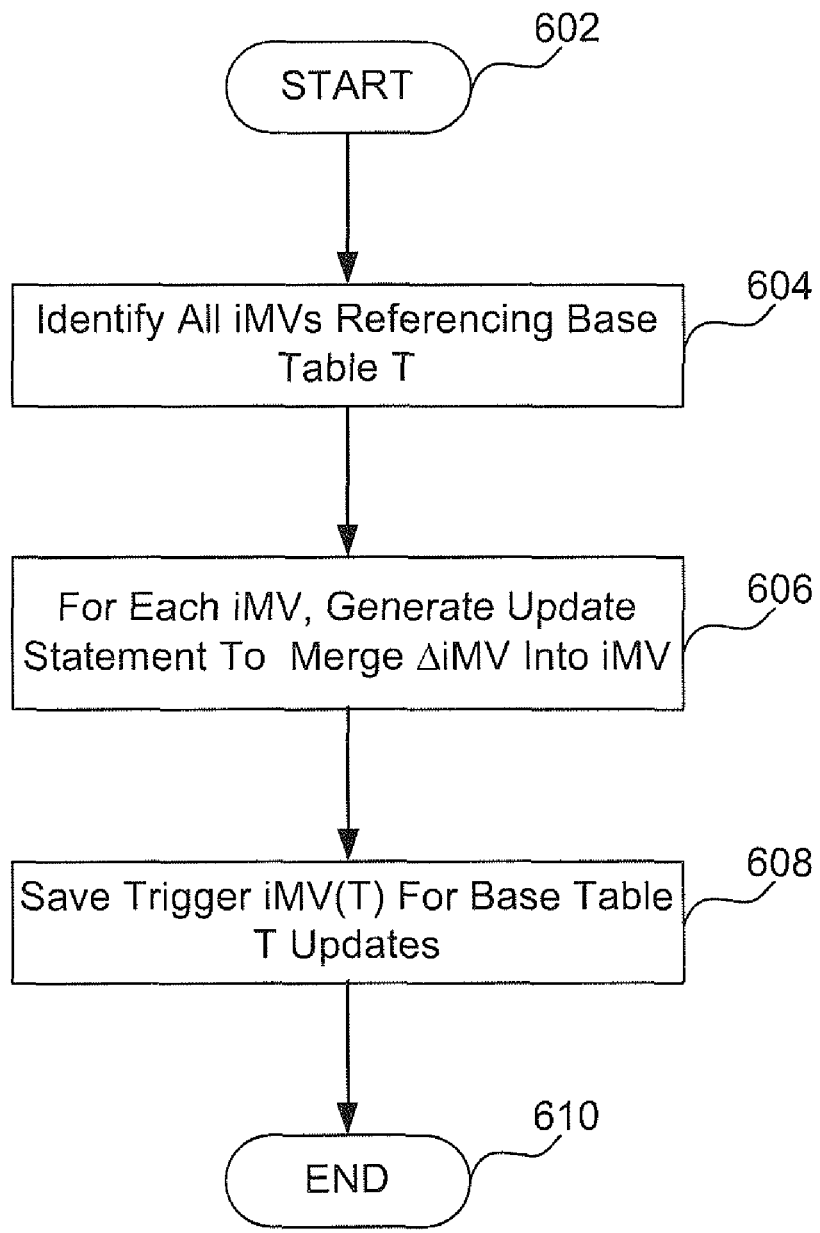

30: ON DML_type = −1 AND rowid($\overline{V}$) = $\overline{\text{Null}(\Delta T,T,\overline{V})}$.d_rowid
31:     WHEN MATCHED THEN DELETE
32: WHEN NOT MATCHED AND DML_type = +1
33:     THEN INSERT Immediate Materialized View Maintenance Methods FIGS. 4-6 are flowcharts illustrating steps by which immediate materialized views (iMVs) are created, in accordance with embodiments of the present invention.

Figure 4:
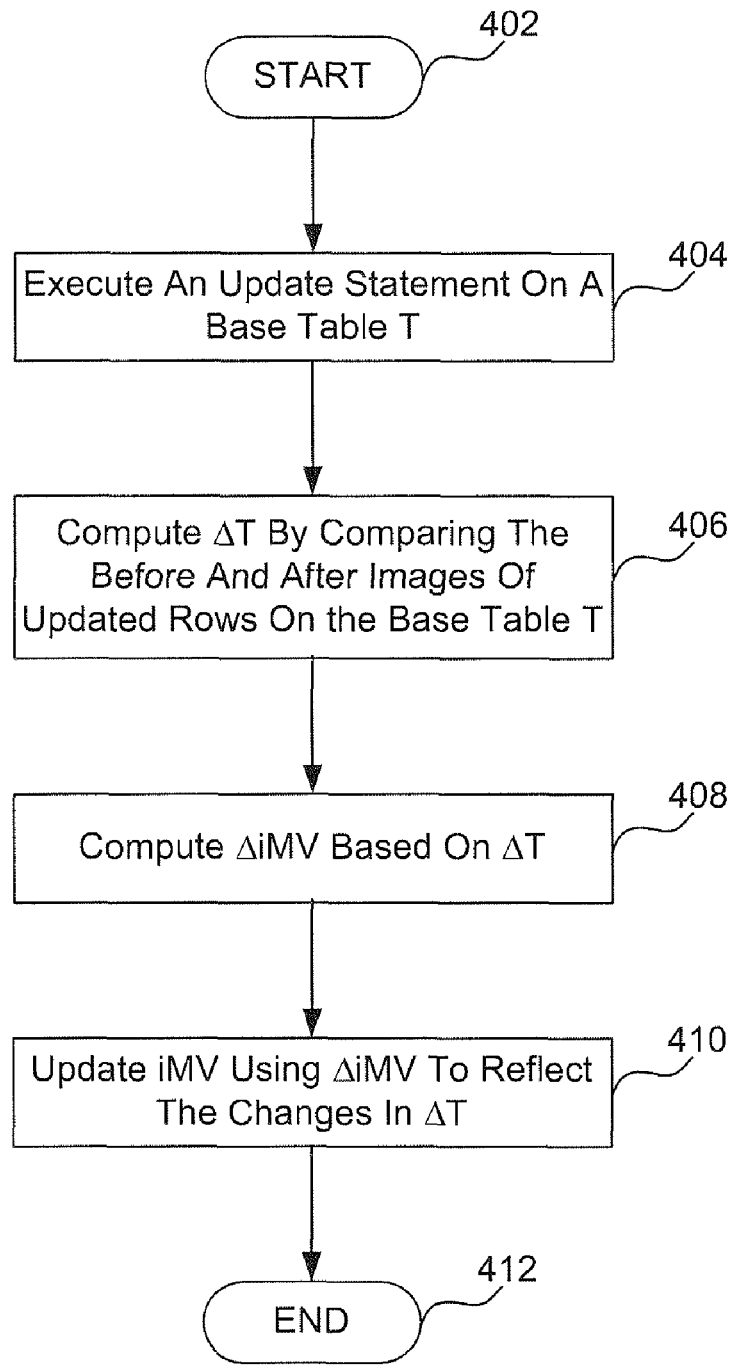
FIGS. 4-6 are flowcharts illustrating steps by which immediate materialized views (iMVs) are incrementally updated in accordance with embodiments of the present invention.

FIG. 4 is a flowchart 400 illustrating steps by which an immediate materialized view (iMV) is updated, in accordance with an embodiment of the present invention.

More particularly, flowchart 400 illustrates the steps by which an iMV update based upon an update to a base table is performed, according to an embodiment of the present invention.

The method begins at step 402 and proceeds to step 404 where an update statement is executed on a base table T. In one embodiment of the invention, T is a database table in a relational database. After the update statement is executed, the method proceeds to step 406.

In step 406, a ΔT, or delta indicating changes base table T, is computed. In an embodiment, this step is performed by comparing before and after images of updated rows in base table T that were updated in step 404. After the ΔT is computed, the method proceeds to step 408.

In step 408, a ΔiMV is computed. According to an embodiment, ΔiMV is computed based on ΔT computed in step 406. After the ΔiMV is computed, the method proceeds to step 410.

In step 410, the iMV view is updated and control is passed to step 412 where the method ends.

In accordance with an embodiment of the invention, this step is performed using ΔiMV to reflect changes in ΔT computed in step 406.

FIG. 5 is a flowchart 500 illustrating steps by which a trigger is executed for an immediate materialized view (iMV), in accordance with an embodiment of the present invention.

More particularly, flowchart 500 illustrates the steps by which iMV trigger that will be used to update each iMV referencing a base table, is created, and then executed according to an embodiment of the present invention.

The method begins at step 502 and proceeds to step 504 where a base table T is updated. According to an exemplary embodiment of the invention, T is a database table in a relational database. After base table T is updated, the method proceeds to step 506.

In step 506, an evaluation is made regarding whether an iMV trigger exists for the base table T updated in step 504. If it is determined that an iMV trigger exists, control is passed to step 510. If it is determined that no iMV trigger exists, then control is passed to step 508 where an iMV trigger is created.

In step 508, after an iMV trigger is created which corresponds to base table T updated in step 504, the method proceeds to step 510.

In step 510, the iMV trigger is executed to update each iMV that references base table T and control is passed to step 512 where the method ends.

FIG. 6 is a flowchart 600 illustrating steps by which a trigger is saved for an immediate materialized view (iMV), in accordance with an embodiment of the present invention.

More particularly, flowchart 600 illustrates the steps by which an iMV trigger is generated and saved for base table updates, according to an embodiment of the present invention.

The method begins at step 602 and proceeds to step 604 where all iMVs referencing a base table T are identified. According to an exemplary embodiment of the invention, T is a database table in a relational database. After the iMVs are identified, the method proceeds to step 606.

In step 606, for each iMV identified in step 604, an update statement is generated.

In an embodiment, this step is performed by generating MERGE SQL statements to merge a ΔiMV into an iMV identified in step 606. After the update statements are generated, the method proceeds to step 608.

In step 608, a trigger, iMV(T), is saved for base table T updates and control is passed to step 610 where the method ends.

FIG. 8 is a flowchart 800 illustrating steps by which a SQL update statement is generated for an iMV after an update of a base table T, in accordance with an embodiment of the present invention.

More particularly, flowchart 800 illustrates the steps by which a SQL update statement is generated for an iMV after an update of a base table T by a ΔT from a PSNS annotated normalized join operator tree, according to an embodiment of the present invention.

The method begins at step 802 and proceeds to step 804 where a determination is made as to whether an iMV references a base table T. According to an exemplary embodiment of the invention, T is a database table in a relational database. After the iMVs are identified, the method proceeds to step 806.

In step 804, an evaluation is made regarding whether an iMV references a base table T. If it is determined that an iMV references a base table T, control is passed to step 808. If it is determined that no an iMV references a base table T, then control is passed to step 806 where the process ends.

In step 808, a Normalized Join Operator Tree, nT(iMV), is built based on the definition of the iMV that references base table T. After the Normalized Join Operator Tree nT is built, the method proceeds to step 810.

In step 810, an evaluation is made regarding whether the Normalized Join Operator Tree built in step 808, nT(iMV), satisfies predicate conditions. If it is determined that the Normalized Join Operator Tree satisfies predicate conditions, control is passed to step 814. If it is determined that the Normalized Join Operator Tree does not satisfy predicate conditions, then control is passed to step 812 where the process ends.

In step 814, a PSNS annotation of the Normalized Operator Join Tree is performed to create PSNS-nT(iMV). After the Normalized Operator Join Tree is annotated, control is passed to step 816.

In step 816, an evaluation is made regarding whether the Normalized Join Operator Tree annotated in step 814, PSNS-nT(iMV), satisfies select list conditions. If it is determined that the annotated Normalized Join Operator Tree satisfies select list conditions, control is passed to step 820. If it is determined that the annotated Normalized Join Operator Tree does not satisfy select list conditions, then control is passed to step 818 where the process ends.

In step 820, a SQL update Statement for an iMV is generated which will be used after an update of based table T by a ΔT, from PSNS-nT(iMV), and control is passed to step 822 where the method ends.

FIG. 9 is a flowchart 900 illustrating steps by which a logical join operator tree is normalized, in accordance with an embodiment of the present invention.

More particularly, flowchart 900 illustrates the steps by which a logical operator tree is normalized based upon the type of relations and joins for nodes of the tree, according to an embodiment of the present invention.

The method begins at step 902 where an operator tree T, a join node n and normalized join nJ is read as input. After the tree is read and parsed, the method proceeds to step 904 where a determination is made as to what type of operation is represented by node n in tree T. In an embodiment, tree T is a logical operator tree, which is a representation of a query where internal nodes n are joins and leaves, are relations. In an embodiment, each node n in a logical operator tree T has a predicate referencing relations from left and right subtrees.

In step 904, an evaluation is made regarding what type of node n is. If the n is leaf of tree T representing a relation, control is passed to step 906 where the relation information is passed to step 908. If n is a node representing an inner join, control is passed to step 910 where the join information is passed to step 912.

If n is a node representing a left outerjoin, control is passed to step 916 where the left outerjoin information is passed to step 914. If n is a node representing a full outerjoin, control is passed to step 920 where the full outerjoin information is passed to step 918.

In step 908, the normalized join nJ is augmented with the new node n based upon the information passed in step 906. In an embodiment, the logic for the function performed in this step is expressed as:
nJ.p=nJ.p AND p//add the predicate of the node n to the normalized join nJ
nJ.ProperRelations U={T}//relation T is part of the normalized join nJ
T.Parent=nJ//relation T has the direct parent the normalized join nJ After the function of step 908 is performed, the method proceeds to step 922.

In step 912, the normalized join nJ is augmented with the new join n based upon the join information passed in step 910. In an embodiment, the logic for the function performed in this step is expressed as:
nJ.p=nJ.p AND p//add the predicate of the node n to the normalized join nJ
CALL nT(T, LEFT CHILD n, nJ)//traverse left child for building the normalized join operator tree
CALL nT(T, RIGHT CHILD n, nJ)//traverse right child for building the normalized join operator tree After the function of step 912 is performed, the method proceeds to step 922.

In step 914, the normalized join nJ is augmented with the new outerjoin n based upon the left outerjoin information passed in step 916. In an embodiment, the logic for the function performed in this step is expressed as:
CALL nT(T, RIGHT CHILD n, nJ)//traverse right child for building the normalized join operator tree $nJ_L$=NEW JOIN//create a new normalized join which will represent the null-supplying side of the outerjoin n
$nJ_L$.type=LEFT OUTERJOIN
$nJ_L$.p=p//the ON predicate is the predicate of the new normalized join $nJ_L$
$nJ_L$.Parent=nJ//the new normalized join $nJ_L$ has as a direct parent the input normalized join nJ
nJ.nJoins U={$nJ_L$}//nJ is the direct parent of the new normalized join $nJ_L$
CALL nT(T, LEFT CHILD n, $nJ_L$)//build the new normalized join $nJ_L$ by traversing the null-supplying side of the outerjoin n After the function of step 914 is performed, the method proceeds to step 922.

In step 918, the normalized join nJ is augmented with the new outerjoin n based upon the full outerjoin information passed in step 920. In an embodiment, the logic for the function performed in this step is expressed as:
$nJ_F$=NEW JOIN//create a new normalized join $nJ_F$ of type full outerjoin
$nJ^F$.type=FULL OUTERJOIN
$nJ_F$.Parent=nJ//the new normalized join has the direct parent nJ
$nJ_F$.p=p//the new normalized join has the predicate the ON predicate of the join n
nJ.nJoins U={$nJ_F$}//the new normalized join has the direct parent nJ
$nJ_L$=NEW JOIN//create a new normalized join $nJ_L$ which will represent the left subtree of the join n
$nJ_L$.type=INNER OUTERJOIN
$nJ_L$.Parent=$nJ_F$//the new normalized join $nJ_L$ has the parent $nJ_F$
$nJ_R$=NEW JOIN//create a new normalized join $nJ_R$ which will represent the right subtree of the join n
$nJ_R$.type=INNER OUTERJOIN
$nJ_R$.Parent=$nJ_F$//the new normalized join $nJ_R$ has the parent $nJ_F$
$nJ_F$.nJoins U={$nJ_L$, $nJ_R$}//the normalized join $nJ_F$ has two direct children $nJ_L$ and $nJ_R$
CALL nT(T, LEFT CHILD n, $nJ_L$)//build the new normalized join $nJ_L$ by traversing one of the null-supplying sides of the full outerjoin n
CALL nT(T, RIGHT CHILD n, $nJ_R$)//build the new normalized join $nJ_R$ by traversing one of the null-supplying sides of the full outerjoin n After the function of step 914 is performed, the method proceeds to step 922.

In step 922, a function is performed for all relations T in Relations (p), where p is the predicate of the node n. In an embodiment, logic for the function performed in step 922 is expressed as:
FOR ALL T IN Relations(p)
IF T.Parent !=nJ, nJF, nJL, nJR
  THEN p is NS-intolerant.

After the function in step 922 is performed, the method ends.

Immediate Materialized View System

FIG. 7 is an example of a system 700 in which the algorithms and methods described above can be implemented. The exemplary system 700 includes a server 704 with a database 706. In an embodiment, server 704 includes relational database management system (RDBMS) and database 706 is a relational database. In embodiments of the system, a plurality of base tables T and immediate materialized views (iMVs) are stored and maintained in database 706. Although a single client 702, server 704, and database 706 is depicted in system 700, it is understood that a plurality of clients 702 and servers 704 can access a plurality of databases 706.

In the exemplary system 700 depicted in FIG. 7, client 702 accesses base tables and iMVs residing in database 706 via server 704. As would be appreciated by one of skill in the relevant arts, other clients 702, such as, but not limited to, mobile clients, laptops, and mobile phones can be used to access server 704 and database 706. In an embodiment, database 706 is an in-memory database implemented without storing data files or data from a variety of data sources (not shown) on disks of server 706.

Example Computer System Implementation

Various aspects of the present invention can be implemented by software, firmware, hardware, or a combination thereof. FIG. 10 illustrates an example computer system 1000 in which the present invention, or portions thereof, can be implemented as computer-readable code. For example, the method illustrated by the flowcharts 400, 500, 600, 800, and 900 of FIGS. 4-6, 8, and 9 can be implemented in system 1000. Also, for example, the components of system 700 depicted in FIG. 7 can be implemented in system 1000. Various embodiments of the invention are described in terms of this example computer system 1000. After reading this description, it will become apparent to a person skilled in the relevant art how to implement the invention using other computer systems and/or computer architectures.

Computer system 1000 includes one or more processors, such as processor 1004. Processor 1004 can be a special purpose or a general-purpose processor. Processor 1004 is connected to a communication infrastructure 1006 (for example, a bus, or network).

Computer system 1000 also includes a main memory 1008, preferably random access memory (RAM), and may also include a secondary memory 1010. Secondary memory 1010 may include, for example, a hard disk drive 1012, a removable storage drive 1014, flash memory, a memory stick, and/or any similar non-volatile storage mechanism. Removable storage drive 1014 may comprise a floppy disk drive, a magnetic tape drive, an optical disk drive, a flash memory, or the like. The removable storage drive 1014 reads from and/or writes to a removable storage unit 1018 in a well-known manner. Removable storage unit 1018 may comprise a floppy disk, magnetic tape, optical disk, etc. which is read by and written to by removable storage drive 1014. As will be appreciated by persons skilled in the relevant art(s), removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 are in the form of signals, which may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, an RF link or other communications channels.

Computer system 1000 may additionally include computer display 1030. According to an embodiment, computer display 1030, in conjunction with display interface 1002, can be used to display a user interface (UI) or a database administrator (DBA) console at client 702 or server 704.

In this document, the terms "computer program medium" and "computer usable medium" are used to generally refer to media such as removable storage unit 1018, removable storage unit 1022, and a hard disk installed in hard disk drive 1012. Signals carried over communications path 1026 can also embody the logic described herein. Computer program medium and computer usable medium can also refer to memories, such as main memory 1008 and secondary memory 1010, which can be memory semiconductors (e.g. DRAMs, etc.). These computer program products are means for providing software to computer system 1000.

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor 1004 to implement the processes of the present invention, such as the steps in the methods illustrated by flowcharts 400, 500, 600, 800, and 900 of FIGS. 4-6, 8, and 9 discussed above. Accordingly, such computer programs represent controllers of the computer system 1000. Where the invention is implemented using software, the software may be stored in a computer program product and loaded into computer system 1000 using removable storage drive 1014, interface 1020, hard drive 1012, or communications interface 1024.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method for creating an internal representation of an immediate materialized outerjoin view, comprising:
   determining whether a previously defined immediate materialized view (iMV) references a base table in a relational database;
   in response to determining that an iMV references the base table, building a normalized join operator tree, wherein the tree is based upon a definition of the iMV;
   determining whether the tree satisfies predicate conditions;
   in response to determining that the tree satisfies the predicate conditions, performing a Preserved Side/Null Supplied Side (PSNS) annotation of the tree, to create an annotated tree;
   determining whether the annotated tree satisfies select list conditions of the iMV;
   forming an internal representation of the iMV using the annotated tree;
   integrating the internal representation with a query optimizer of a relational database management system (RDBMS); and
   in response to determining that the annotated tree satisfies the select list conditions, generating exactly one structured query language (SQL) UPDATE statement for the iMV to be used in response to detecting that the base table is updated, wherein the exactly one UPDATE statement relaxes restrictions imposed by the definition of the iMV by:
      not requiring intermediate temporary tables for updating not-null-supplied tuples and null-supplied tuples; and
      computing not-null-supplied tuples in the same time to null-supplied tuples for updating the iMV.

2. The method of claim 1, wherein the update statement is a structured query language (SQL) statement.

3. The method of claim 1, wherein the update statement is a MERGE, INSERT, UPDATE, or DELETE statement.

4. The method of claim 1, wherein the select list conditions of the iMV do not require a primary key.

5. The method of claim 4, wherein the select list conditions of the iMV do not require a primary key for each relation referenced in the outerjoin view.

6. The method of claim 5, wherein the select list conditions of the iMV include a subset of relations having primary keys.

7. The method of claim 6, wherein the select list conditions of the iMV include a subset of relations that must have primary keys.

8. The method of claim 7, wherein the subset of relations comprises relations referenced as a preserved side in an outerjoin.

9. The method of claim 1, wherein the update of the base table is based on a computed delta of the base table.

10. The method of claim 9, wherein the delta of the base table is computed based upon a comparison of a before image of the base table to an after image of the base table.

11. A non-transitory computer-readable medium having instructions stored thereon that, when executed by a processor, cause the processor to perform operations to create an internal representation of an immediate materialized outerjoin view, the operations comprising:
   determining whether a previously defined immediate materialized view (iMV) references a base table in a relational database;
   in response to determining that an iMV references the base table, building a normalized join operator tree, wherein the tree is based upon a definition of the iMV;
   determining whether the tree satisfies predicate conditions;
   in response to determining that the tree satisfies the predicate conditions, performing a Preserved Side/Null Supplied Side (PSNS) annotation of the tree to create an annotated tree;
   determining whether the annotated tree satisfies select list conditions of the iMV;
   forming an internal representation of the iMV using the annotated tree;
   integrating the internal representation with a query optimizer of a relational database management system (RDBMS); and
   in response to determining that the annotated tree satisfies the select list conditions, generating exactly one structured query language (SQL) UPDATE statement for the iMV to be used in response to detecting that the base table is updated, wherein the exactly one UPDATE statement relaxes restrictions imposed by the definition of the iMV by:
      not requiring intermediate temporary tables for updating not-null-supplied tuples and null-supplied tuples; and
      computing not-null-supplied tuples in the same time to null-supplied tuples for updating the iMV.

12. The non-transitory computer-readable medium of claim 11, wherein the update statement is a structured query language (SQL) statement.

13. The non-transitory computer-readable medium of claim 11, wherein the update statement is a MERGE, INSERT, UPDATE, or DELETE statement.

14. The non-transitory computer-readable medium of claim 11, wherein the select list conditions of the iMV do not require a primary key.

15. The non-transitory computer-readable medium of claim 14, wherein the select list conditions of the iMV do not require a primary key for each relation referenced in the outerjoin view.

16. The non-transitory computer-readable medium of claim 15, wherein the select list conditions of the iMV include a subset of relations having primary keys.

17. The non-transitory computer-readable medium of claim 16, wherein the select list conditions of the iMV include a subset of relations that must have primary keys.

18. The non-transitory computer-readable medium of claim 17, wherein the subset of relations comprises relations referenced as a preserved side in an outerjoin.

19. The non-transitory computer-readable medium of claim 11, wherein the update of the base table is based on a computed delta of the base table.

20. The non-transitory computer-readable medium of claim 19, wherein the delta of the base table is computed based upon a comparison of a before image of the base table to an after image of the base table.

21. A computer-based system for creating an internal representation of an immediate materialized outerjoin view, comprising:
   one or more processors;
   a module configured to determine, using the one or more processors, whether a previously defined immediate materialized view (iMV) references a base table in a relational database;
   a module configured to, in response to determining that an iMV references the base table, build a normalized join operator tree, wherein the tree is based upon a definition of the iMV;

a module configured to determine, using the one or more processors, whether the tree satisfies predicate conditions;

a module configured to, in response to determining that the tree satisfies the predicate conditions, perform a Preserved Side/Null Supplied Side (PSNS) annotation of the tree to create an annotated tree;

a module configured to determine, using the one or more processors, whether the annotated tree satisfies select list conditions of the iMV;

a module configured to form, using the one or more processors, an internal representation of the iMV using the annotated tree;

a module configured to integrate, using the one or more processors, the internal representation with a query optimizer of a relational database management system (RDBMS); and a module configured to, in response to determining that the annotated tree satisfies the select list conditions, generate exactly one structured query language (SQL) UPDATE statement for the iMV to be used in response to detecting that the base table is updated, wherein the exactly one UPDATE statement relaxes restrictions imposed by the definition of the iMV by:

not requiring intermediate temporary tables for updating not-null-supplied tuples and null-supplied tuples; and computing not-null-supplied tuples in the same time to null-supplied tuples for updating the iMV.

22. The computer-based system of claim 21, wherein the update statement is a structured query language (SQL) statement.

23. The computer-based system of claim 21, wherein the update statement is a MERGE, INSERT, UPDATE, or DELETE statement.

24. The computer-based system of claim 21, wherein the select list conditions of the iMV do not require a primary key.

25. The computer-based system of claim 24, wherein the select list conditions of the iMV do not require a primary key for each relation referenced in the outerjoin view.

26. The computer-based system of claim 25, wherein the select list conditions of the iMV include a subset of relations having primary keys.

27. The computer-based system of claim 26, wherein the select list conditions of the iMV include a subset of relations that must have primary keys.

28. The computer-based system of claim 27, wherein the subset of relations comprises relations referenced as a preserved side in an outerjoin.

29. The computer-based system of claim 21, wherein the update of the base table is based on a computed delta of the base table.

30. The computer-based system of claim 29, wherein the delta of the base table is computed based upon a comparison of a before image of the base table to an after image of the base table.

* * * * *